(12) United States Patent
Yang et al.

(10) Patent No.: US 8,175,969 B2
(45) Date of Patent: May 8, 2012

(54) ARCHITECTURE AND METHOD FOR BILL PRESENTMENT USING A WEB-BASED TOOL

(75) Inventors: Danhong (Amy) Yang, Fremont, CA (US); Govind Jayanth, Union City, CA (US); Libing Shao, Foster City, CA (US); Nami Hosomatsu, San Jose, CA (US); Tapomoy Dey, Sunnyvale, CA (US); K. C. Buckley Merce, St. Louis, MO (US); Alan Fothergill, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1422 days.

(21) Appl. No.: 10/453,222

(22) Filed: Jun. 2, 2003

(65) Prior Publication Data

US 2009/0043689 A1    Feb. 12, 2009

(51) Int. Cl.
*G06Q 40/00* (2006.01)
(52) U.S. Cl. ......................................................... 705/40
(58) Field of Classification Search ............... 705/35–45
See application file for complete search history.

(56) References Cited

U.S. PATENT DOCUMENTS

| | | | |
|---|---|---|---|
| 6,304,857 B1* | 10/2001 | Heindel et al. | 705/34 |
| 6,370,537 B1* | 4/2002 | Gilbert et al. | 1/1 |
| 6,385,595 B1* | 5/2002 | Kolling et al. | 705/40 |
| 6,460,072 B1* | 10/2002 | Arnold et al. | 709/203 |
| 7,158,967 B1* | 1/2007 | Turba et al. | 1/1 |
| 7,207,001 B2* | 4/2007 | Bailey et al. | 715/234 |
| 7,584,425 B2* | 9/2009 | Nader et al. | 715/255 |
| 2001/0032181 A1* | 10/2001 | Jakstadt et al. | 705/40 |
| 2007/0265944 A1* | 11/2007 | Catahan et al. | 705/30 |

* cited by examiner

*Primary Examiner* — Charles Kyle
*Assistant Examiner* — Clifford Madamba
(74) *Attorney, Agent, or Firm* — Kilpatrick Townsend & Stockton LLP

(57) ABSTRACT

An architecture and method for bill presentment using a web-based tool is disclosed. A common architecture collects billing data from multiple business technology systems and present the billing data on a bill. A user-friendly tool allows internal billing personnel and system administrators to configure the content and format of a bill before presenting it to customers. A method provides external customers with drill-down ability, enabling them to view both summary and detailed billing data and related information necessary to understand and pay the bill.

21 Claims, 34 Drawing Sheets

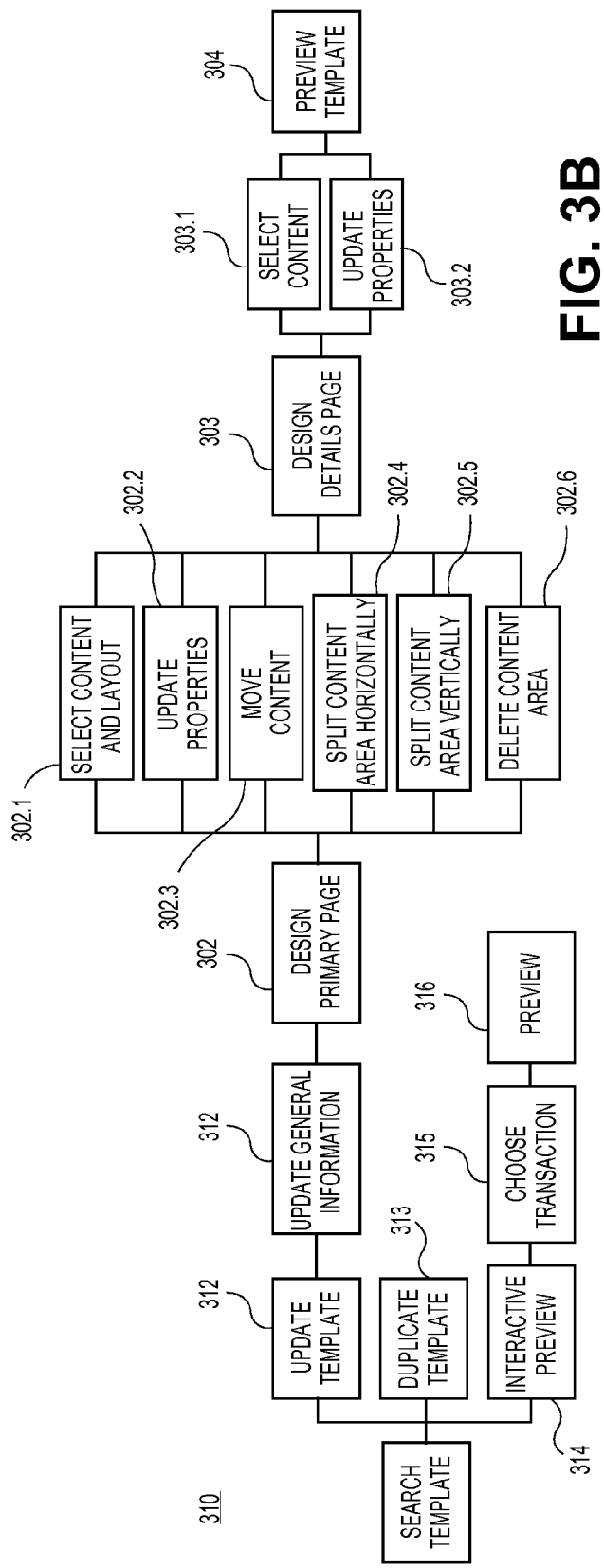

369

Billing Lines Section  369C

Select available content to add to the summarized tax table. Use reorder icons to specify table column order.

Available Content Items        Selected Content Items

```
Quantity                            Item Number
Tax Name                            Item Description
Tax Rate          Move              Bill From        369B2
                                    Bill To
                  Move All          Billing Duration
      369B1                         Taxable Flag
                  Remove            Unit Price
                                    Extended Amount
                  Remove
Description       All               Description
```

☐ Display Rolled-up Oracle Receivables Transaction Lines if available    369D
☐ Display Itemized Tax   369P
If checked, itemized tax for each eligible line will appear below the line.

Summarized Tax Section  369T

Select available content to add to the summarized tax table. Use reorder icons to specify table column order.

Available Content Items        Selected Content Items

```
Taxable Amount
Tax Amount
Tax Code          Move
Tax Name                            369B4
Tax Rate          Move All 369B3       Remove Remove
Description       All               Description
```

FIG. 3I

Select Content — 371

Cancel  Apply

Content Area Details

Service

Select available content to add to the billing line details table. Use reorder icons to specify table column order.

371B1 Available Content Items         Selected Content Items         371B2

Available Content Items:
- Connectivity
- Dimensions
- Item Number
- Make
- Memory
- Model
- Processor
- Resolution
- Weight Move / Move All / Remove / Remove All Description

Usage

Select available content to add to the billing line details table. Use reorder icons to specify table column order.

371B3 Available Content Items         Selected Content Items         371B4

Available Content Items:
- Counter ID
- Current Counter Reading
- Item Number
- Previous Counter Reading
- Net Reading
- Reading After Reset
- Reading Before Reset
- Reading Source
- Reset Move / Move All / Remove / Remove All Description

FIG. 3K

Bill Management

Templates | Content Items | Test Data

Logout  Help
Template Management | Template Assignment | Configuration

372

General Information — Primary Page Design — Details Page Design — Preview

Update Properties

Cancel   Apply

Content Area Details

Service

Update the display labels for the individual content items. For contents with linkable drilldown information, choose from the list of drilldown URL names. Drilldown URL names are set up in the Configuration tab.   372F

| Item Name | Item Display Label | Drilldown URL Name |
|---|---|---|
| Item Number | Item Number | ▼  Comp4us Home / Purchase Order Site / Sales Order Site |
| Make | Make | |
| Model | Model | |
| Memory | Memory | |
| Processor | Processor | |

372M

Cancel   Apply

Template Management | Template Assignment | Configuration | Logout | Help

Privacy Statement

FIG. 3L

Bill Management

Templates | Content Items | Test Data

Template Management / Template Assignment / Configuration

⊗ Logout  ? Help

Templates

Search for a template to update or create a new template.

Search

Template Name: [Standard] — 374N
Template Description: — 374D
Primary Data Source: Receivables ▼ — 374S
Supplementary Data Source:

(Go)

Results: Templates — 374R

◁ Previous  1-25 of 50 ▶ Next 25  (Create)

| Template Name | Template Description | Supplementary Data Source | Update | Duplicate | Interactive Preview |
|---|---|---|---|---|---|
| Invoice Standard | Standard AR invoice template | None | ✎ | 📋 | 📋 |
| OEX Basic | Standard OEX invoice template | Oracle Exchange | ✎ | 📋 | 📋 |
| OKS Basic | Standard OKS invoice template | Oracle Service Contracts | ✎ | 📋 | 📋 |
| OM Basic | Standard OM invoice template | Oracle Order Management | ✎ | 📋 | 📋 |

374U

Template Management | Template Assignment | Configuration | Logout | Help

Privacy Statement

FIG. 3N

Bill Management

Templates | Content Items | Test Data

Template Management : Templates > Interactive Preview — 375TD

Interactive Preview

Logout  Help  Configuration

/ Template Management / Template Assignment /

Template    KS Basic

Choose the transaction to preview.

◎ Previous | 1-25 of 50 ▶ | Next 25 ⊙    Preview

| Transaction Number | Supplementary Data Source | Customer |
|---|---|---|
| 1004 | Service Contracts | Universal Card |
| 1005 | Service Contracts | Universal Card |

(Cancel)

Template Management | Template Assignment | Configuration | Logout | Help

Privacy Statement

375

FIG. 3O http://localhost:0038/guide/browse/Z_Invoice1.aps

376

Company, Inc.
Bill To:
Universal Card Co.
2391 L Street
San Jose, CA 95106 US

Remit To:
PO Box 8790543
ATTN: Accounts Receivables
Company, INC.
San Mateo, CA 94002 US Please include the invoice number on all remittances and include remittance copy with postal payments Invoice
1005

Start Data          End Date
1-JAN-2002          31-DEC-2002
          Customer Number
              1006

Ship To:
Universal Card
2391 L Street
San Jose, CA 95106 US

Shipping Reference          Ship Via

Contract Number
12345

| Terms | Due Date | Salesperson | Customer Contact | Customer Phone | Customer Fax |
|---|---|---|---|---|---|
| 30d,14d-2% | 19-Aug-2001 | Green, Ms. Suzanne | Weilem | 615-522-3600 | 615-522-3621 |

| Item Number | Description | Bill From | Bill To | Billing Duration | Taxable | Unit Price | Extended Amount |
|---|---|---|---|---|---|---|---|
| 1 | Service - Gold Support (24x7) | 1-JAN-2002 | 31-JAN-2002 | 31 | | | 1271.00 |
| 2 | Service - Silver Support | 1-JAN-2002 | 31-JAN-2002 | 31 | | | 630.00 |

Subtotal 1901.00
Tax 0.00
Shipping 0.00
Total 1901.00
Payment and Credits 0.00
Financial Charges 0.00
Outstanding Balance 1901.00

Special Instructions
1. For question regarding this invoice, please contact B Johnson 2. 1.5% per month finance charge will be charged for all past due invoices. All software is licensed in accordance with the terms and conditions of the software license and service agreement or referenced GSA schedule contract Close Window

FIG. 3P

Bill Management

| Templates | Content Items | Test Data |

Template Management > Content Items > Create Content Item

Create Content Item

* Indicates required field

* Item Name — 377N
Item Description — 377D
Display Label — 377L
Drilldown URL Name — 377G
377U — ○ Image
377B1 — ○ Text    Browse — 377B
   This is the filename for line image
* Item Name
377B2 —    377T
   This text will appear on the presented bill Template Management | Template Assignment | Configuration | Logout | Help Templates | Content Items | Test Data → Template Management / Template Assignment / Configuration Logout  Help Cancel  Apply Privacy Statement

Bill Management

378

| Templates | Content Items | Test Data |

Content Items

Search for content items to update or create new content items for your template.

Search

- Item Name: L
- Rule Description:
- Item Data Source: ▼
- Item Type: ▼

[Go]

Results: Content Items

Previous | 1-25 of 50 ▼ | Next 25

| Item Name | Item Data Source | Item Type | Item Description | Display Label | Drilldown URL Name | Update | Delete |
|---|---|---|---|---|---|---|---|
| Line Amount | Receivables | Data | Amount total of invoice lines | Subtotal | | ✎ | 🗑 |
| Line Number | Receivables | Data | Reference line number | Line Number | | ✎ | 🗑 |
| Link to Home | User-Defined | Text | Link to company home page | Home: | Comp4us Home | ✎ | 🗑 |
| Logo Image A | User-Defined | Image | Logo for template AAA | | | ✎ | 🗑 |

378S

Template Management | Template Assignment | Configuration | Logout | Help

Privacy Statement

FIG. 3R

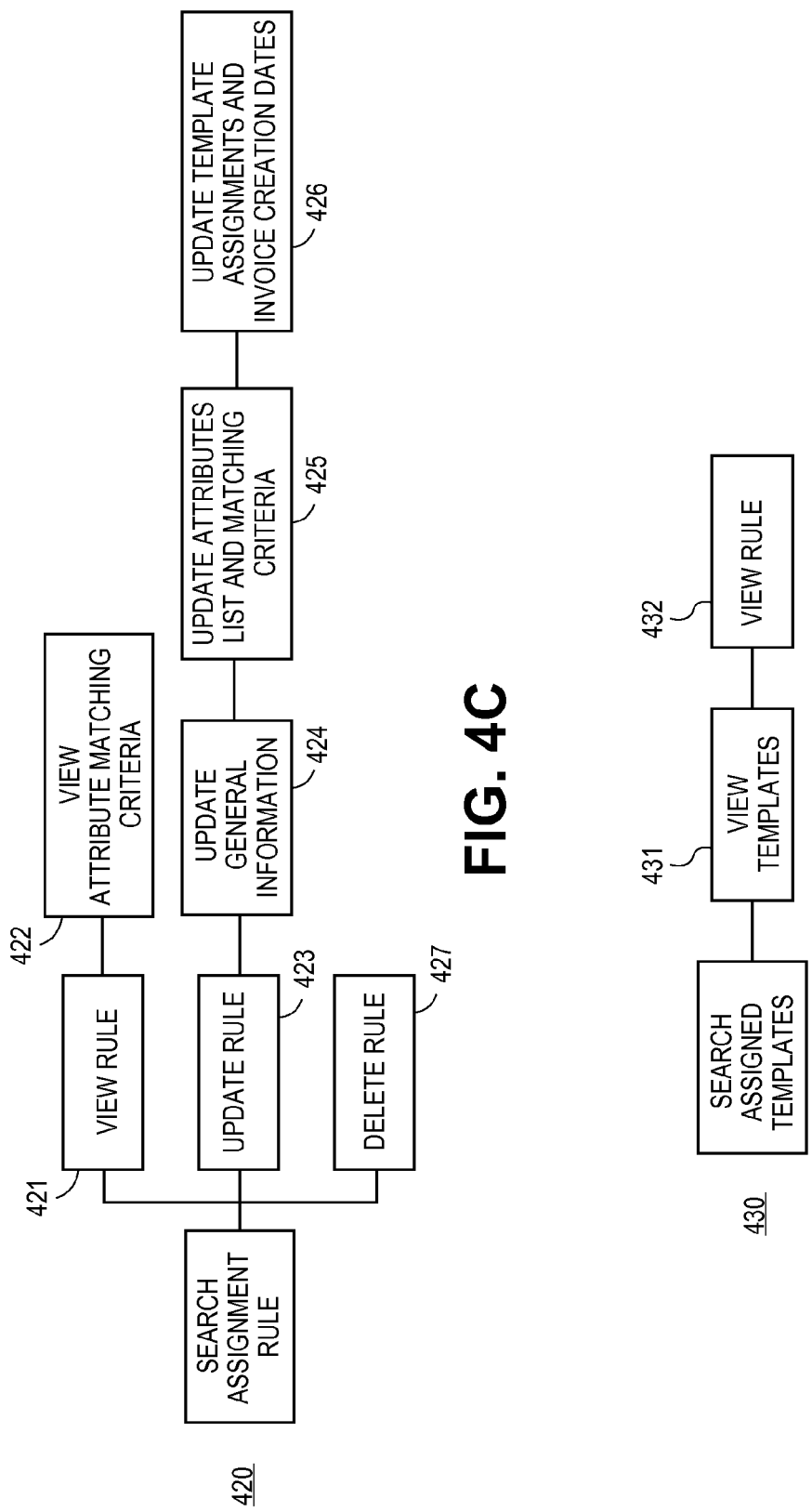

Bill Management

435

Assignment Rules | Assigned Templates

Template Assignment : Assignment Rules > Create Rule

Create Rule

Create an assignment rule. Templates will be assigned based on rule attributes.
\* Indicates required field

* Rule Name [_____] — 435N
Description [_____] — 435D

Receivables

\* Supplementary Data Source [None ▼] — 435S

Attribute Matching Criteria

Select pre-defined attributes and enter matching criteria.

Match ● All attributes
435A —    ○ Any attributes   } 435B    435C        435V

| Attribute Name | Condition | Value | Remove |
|---|---|---|---|
| Bill to City ▼ | equals ▼ | | 🗑 |

Bill to City
Bill to Country
Bill to State
Billing Date
Bill to Customer Name
Oracle Receivables Tax Printing Option
Outstanding Balance
Profile Class
Shipping Via
Ship to Customer Name
Term Name

— 435L (Cancel) (Apply)

Template Management | Template Assignment | Configuration | Logout | Help

Privacy Statement

FIG. 4E

Bill Management

Assignment Rules | Assigned Templates

Template Assignment : Assignment Rules > Create Rule > Create Rule: Assign Template

Create Rule: Assign Template

Assign templates to the rule, indicating effective dates.

| Assigned Template | Effective From Date | Effective To Date | Remove |
|---|---|---|---|
| OKS Basic ▼ | ☐ | ☐ | ✏️ |

(Add Another Row)

436A — 436F — 436T

436

Template Management | Template Assignment | Configuration | Logout | Help

Template Management / Template Assignment / Configuration

Logout | Help (Cancel) (Apply)

Privacy Statement

FIG. 4F

Bill Management

Assignment Rules | Assigned Templates

Assignment Rules

Search for an assignment rule to update or create a new rule. Assignment rules will be applied based on rule order.

Search

Rule Name: *KS — 440N
Rule Description: — 440D
Primary Data Source: Receivables
Supplementary Data Source: — 440S

[Go]

Results: Rules

440A →   440R

| Rule Name | Rule Description | Supplementary Data Source | Update | Delete |
|---|---|---|---|---|
| KS Default | Default for KS | Service Contracts | ✎ | 🗑 |
| KS Finance Customers | KS Finance Customers | Service Contracts | ✎ | 🗑 |
| KS Healthcare | KS Healthcare Industry customers | Service Contracts | ✎ | 🗑 |
| KS High Tech | High Tech KS customers | Service Contracts | ✎ | 🗑 |
| KS Test | Testing Rule | Service Contracts | ✎ | 🗑 |

440B

Template Management | Template Assignment | Configuration | Logout | Help

FIG. 4H

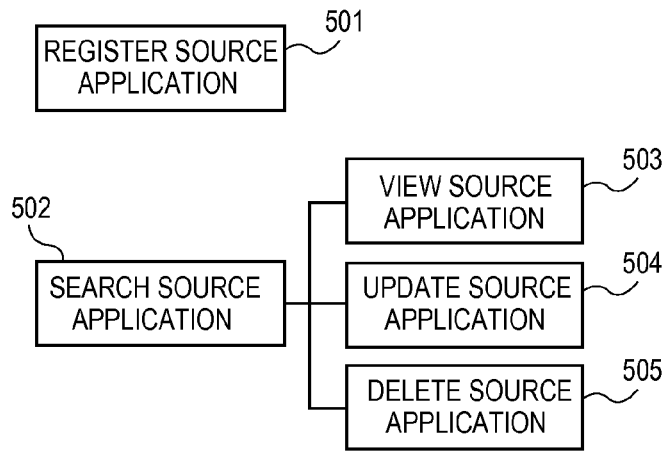
FIG. 5A1
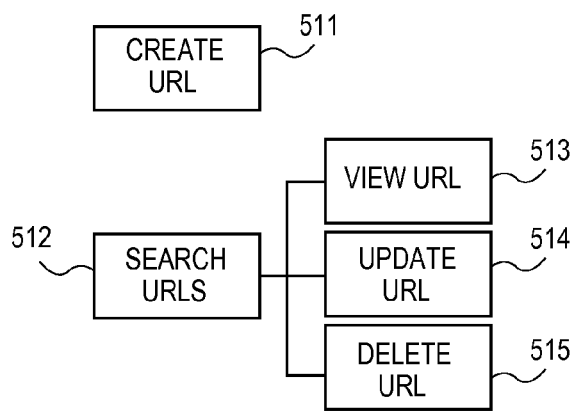
FIG. 5A2

Bill Management

516

Template Management | Template Assignment | Configuration

Configuration : Drilldown URLs > Add URL
Add URL
Added URLs will be available for inclusion onto a template via association to content items.
* Indicates required field

* URL Name — 516N
Description — 516D
* URL — 516U

URL Parameters — 516M
Enter URL parameters and their values. Parameter value must either be fixed or mapped to a transaction attribute.

| Type | Name | Value | Encrypt | Remove |
|---|---|---|---|---|
| Fixed Value ▼ | | | ☐ | 🖉 |
| Fixed Value ▼ | | | ☐ | 🖉 |
| Fixed Value | | | | |
| Transaction Attribute | | | | |

526T    516P    516V    516E    516R

Cancel    Apply

Template Management | Template Assignment | Configuration | Logout | Help

Privacy Statement

FIG. 5B

ORACLE 608

Bill To:
Universal Card Co.
2391 L Street
San Jose, CA 95106 US

Remit To:
PO Box 8790543
ATTN: Accounts Receivables
Company, INC.
San Mateo, CA 94002 US Please include the invoice number on all remittances and include remittance copy with postal payments Invoice 1005

Start Data 1-JAN-2002    End Date 31-DEC-2002
Customer Number 1006

Ship To:
ATT Universal Card
2391 L Street
San Jose, CA 95106 US

610

Shipping Reference    Contract Number 12345    Ship Via

| Terms | Due Date | Salesperson | | Customer Contact | | Customer Phone | | Customer Fax | |
|---|---|---|---|---|---|---|---|---|---|
| 30d,14d-2% | 19-Aug-2001 | Green, Ms. Suzanne | | Wellem | | 615-522-3600 | | 615-522-3621 | |
| Item Number | Description | | Bill From | Bill To | Billing Duration | Taxable | Unit Price | Extended Amount | |
| 1 | Service - Gold Support (24x7) | | 1-JAN-2002 | 31-JAN-2002 | | 31 | | 1271.00 | |
| 2 | Service - Silver Support | | 1-JAN-2002 | 31-JAN-2002 | | 31 | | 630.00 | |

609

Subtotal 1901.00
Tax 0.00
Shipping 0.00
Total 1901.00
Payment and Credits 0.00
Financial Charges 0.00
Outstanding Balance 1901.00

Special Instructions
1. For question regarding this invoice, please contact B Johnson
2. 1.5% per month finance charge will be charged for all past due invoices. All software is licensed in accordance with the terms and conditions of the software license and service agreement or referenced GSA schedule contract

FIG. 6B

Invoice 1005 > Service - Gold Support (24x7)    611

| Item Number | Description | Bill From | Bill To | Billing Duration | Taxable | Unit Price | Extended Amount |
|---|---|---|---|---|---|---|---|
| 1.1 | Covered Product - Printer | 1-JAN-2002 | 31-JAN-2002 | 31 | Y | 2 | 62.00 |
| 1.2 | Covered Product - Copier | 1-JAN-2002 | 31-JAN-2002 | 31 | Y | 1 | 31.00 |
| 1.3 | Covered Product - 111 | 1-JAN-2002 | 31-JAN-2002 | 31 | Y | 1 | 31.00 |
| 1.4 | Covered Product - 222 | 1-JAN-2002 | 31-JAN-2002 | 31 | Y | 1 | 31.00 |
| 1.5 | Covered Product - 333 | 1-JAN-2002 | 31-JAN-2002 | 31 | Y | 1 | 31.00 |
| 1.6 | Covered Product - A | 1-JAN-2002 | 31-JAN-2002 | 31 | Y | 1 | 31.00 |
| 1.7 | Covered Product - B | 1-JAN-2002 | 31-JAN-2002 | 31 | Y | 1 | 31.00 |
| 1.8 | Covered Product - C | 1-JAN-2002 | 31-JAN-2002 | 31 | Y | 1 | 31.00 |
| 1.9 | Covered Product - D | 1-JAN-2002 | 31-JAN-2002 | 31 | Y | 1 | 31.00 |
| 1.10 | Covered Product - E | 1-JAN-2002 | 31-JAN-2002 | 31 | Y | 1 | 31.00 |
| 1.11 | Covered Product - F | 1-JAN-2002 | 31-JAN-2002 | 31 | Y | 1 | 31.00 |
| 1.12 | Covered Product - G | 1-JAN-2002 | 31-JAN-2002 | 31 | Y | 1 | 31.00 |
| 1.13 | Covered Product - H | 1-JAN-2002 | 31-JAN-2002 | 31 | Y | 1 | 31.00 |
| 1.14 | Covered Product - I | 1-JAN-2002 | 31-JAN-2002 | 31 | Y | 1 | 31.00 |
| 1.15 | Covered Product - J | 1-JAN-2002 | 31-JAN-2002 | 31 | Y | 1 | 31.00 |
| 1.16 | Covered Product - K | 1-JAN-2002 | 31-JAN-2002 | 31 | Y | 1 | 31.00 |
| 1.17 | Covered Product - L | 1-JAN-2002 | 31-JAN-2002 | 31 | Y | 1 | 31.00 |
| 1.18 | Covered Product - M | 1-JAN-2002 | 31-JAN-2002 | 31 | Y | 1 | 31.00 |
| 1.19 | Covered Product - N | 1-JAN-2002 | 31-JAN-2002 | 31 | Y | 1 | 31.00 |
| 1.20 | Covered Product - O | 1-JAN-2002 | 31-JAN-2002 | 31 | Y | 1 | 31.00 |
| 1.21 | Covered Product - P | 1-JAN-2002 | 31-JAN-2002 | 31 | Y | 1 | 31.00 |
| 1.22 | Covered Product - Q | 1-JAN-2002 | 31-JAN-2002 | 31 | Y | 1 | 31.00 |
| 1.23 | Covered Product - R | 1-JAN-2002 | 31-JAN-2002 | 31 | Y | 1 | 31.00 |
| 1.24 | Covered Product - S | 1-JAN-2002 | 31-JAN-2002 | 31 | Y | 1 | 31.00 |
| 1.25 | Covered Product - T | 1-JAN-2002 | 31-JAN-2002 | 31 | Y | 1 | 31.00 |
| | | | | | | Total: | 606.00 |

◁ Previous  1-25 of 40  ▶ Next 15 ⊘

| Invoice 1005 > Service - Gold Support (24x7) > Covered Product - Printer | | | | |
|---|---|---|---|---|
| Item Number | Make | Model | Memory | Processor |
| 1.1.1 | Hewlett Packard | LaserJet 4050N | 16 MB RAM | 133 MHz RISC |
| 1.1.2 | Hewlett Packard | LaserJet 5000C | 24 MB RAM | 133 MHz RISC |

ARCHITECTURE AND METHOD FOR BILL PRESENTMENT USING A WEB-BASED TOOL

FIELD OF THE INVENTION

Embodiments of the present invention relate to the field of business technology. Specifically, embodiments of the present invention relate to an architecture and method for bill presentment using a web-based tool.

BACKGROUND OF THE INVENTION

Large volumes of modern business are conducted on the basis of billing. For the goods it sells and the services it provides, a supplier business entity bills a customer, be it a number of individual consumers or another business entity. The customer pays for the goods and services on the basis of the bill. Typically, a bill is for a certain amount owed to the supplier and is to be paid by the customer in full on or before a certain date.

It can be problematic for the supplier business entity if its customers do not pay their bills on time and in the entire amount billed, as this can negatively affect cash flow, and have other negative effects. It is known that customers are more likely to pay their bills on time and in their entirety where the bills they are paying are easy to understand and clearly reflect information the customer uses to reconcile the purchase to the payment request made therein.

Conventionally, suppliers use software to electronically generate bills and send them to their customers. These bills usually have pre-defined fixed formats and contain data (e.g., billing data) accrued from a specified source system. Such source systems include for instance a billing system or an accounts receivable system. The billing data included on a bill and the format by which the bill presents the billing data are generally somewhat uniform for a particular supplier business.

The customers however may not be satisfied with the bill they receive from the supplier business entity. Lack of satisfaction with the bill can delay the customers' response to the bill even to the point where the bill is not timely paid. Further, lack of satisfaction with the bill can result in the customers not remitting the full amount requested for payment. Customers' lack of satisfaction with the bills they receive from a supplier business entity can have a number of sources.

Reasons customers can be disaffected with a supplier's bill can be rooted in the information provided (e.g., or not provided) or the way the information is organized or presented thereon. One such reason is that a bill received by a customer may lack certain general information needed by the customer to reconcile the bill with a corresponding purchase order. Different customers may need to have certain information available on the bill to make this reconciliation effective.

For instance, a customer may need information to appear on the bill to include a supplier's tax registration number, the corresponding purchase order number, a contract number, contract effective dates, payment terms, shipping information, and other such information. However, the bill the customer receives may lack one or more of the information items. Lacking the information can make it difficult or inconvenient for the customer to make the reconciliation.

Another reason that a customer may be disaffected with a bill is that the purchased items as stated on the bill may differ from the purchased items as stated on the purchase order, in terms of item descriptions and amounts. This situation can arise for example when a supplier wants to account separately for different elements of a sale in order to bill a customer for a bundle of the goods and/or services it provided.

A third reason that a customer may be disaffected with a bill is that the bill may lack detailed supporting information regarding how the charges thereon were calculated, which the customer may desire to effectively reconcile the bill with its corresponding purchase order. For example, such information can include detailed information on usage, charges, rates, purchased items and/or services, and the like.

A fourth reason that a customer may be disaffected with a bill is that the customer may have a specific preference on the format that a bill will take when it is presented, and the bill may be in a format other than that preferred by the customer. The supplier business entity however has an interest in formatting its bills in it own format, to include unique identifying logos and other trade dress, as well as payment and marketing messages and other notices.

Business entities have conventionally addressed customer dissatisfaction with their bills by performing customizations on their bill presentment application, in order to accommodate some customers' demands. The customizations are typically designed to retrieve various billing information and to pre-define various bill presentment formats, depending on their own needs as well as the requirements of their various customers. Such customization however can pose an expensive and daunting challenge.

For instance, technical programming is utilized when a bill must be customized. Such technical programming can require a high level of expertise and focusing on a single customer's requirements to accomplish. Conventional bill customization requires the attention of a skilled programmer, whose attention must be diverted to the customization task at hand. Thus, conventional bill customization can be both expensive and resource-intensive, in terms of labor. Such costs and resource demands increase with the size of the customer base and the degree of accommodation provided to each.

Where customization is not used (e.g., or used inadequately), customers' confusion or questions regarding a bill formatted other than to the customers' preferences can also conventionally require expenses and require the investment of resources to resolve, as well as reflecting a certain rigidity, inflexibility, or inability to accommodate customers. Human intervention may be required to assist customers with reconciling their bills with their purchase orders. This can be expensive and resource-intensive to the customer, as well as to the supplier company.

First, a customer must call, write, or email the supplier company regarding the issue with the bill, such as to request validation of how a charge is calculated, to request certain information that does not appear on the bill, but which the customer needs to reconcile the bill and the corresponding purchase order, or to inquire about discrepancies between the bill and the corresponding purchase order. Then, a representative of the supplier company such as customer service or receivables/collections must individually deal with the inquiries. Concomitant customer dissatisfaction can lead to a deterioration in the good will that a company or other entity enjoys with a customer.

Thus, conventional approaches to bill presentment taken by business entities can be inadequate. Customization of bills for clients can be expensive and wasteful of resources. The expense and wastefulness increases with the size of the customer base an entity such as a business is attempting to accommodate. However, by not so customizing, a company can find themselves in the position of having to respond to customer dissatisfaction and/or confusion. Such a reactive response can also be expensive and wasteful, and can lead to further loss of good will.

SUMMARY OF THE INVENTION

What is needed is a common architecture for collecting billing data from multiple business technology systems and present the billing data on a bill. What is also needed is a user-friendly tool that allows internal billing personnel and system administrators to configure the content and format of a bill before presenting it to customers. Further, what is needed is a system and/or method that provides external customers with drilldown ability, so as to view both summary and detailed billing data and related information necessary to understand and pay the bill.

An architecture and method for bill presentment using a web-based tool is disclosed. A common architecture collects billing data from multiple business technology systems and present the billing data on a bill. A user-friendly graphical user interface (GUI) driven tool allows internal billing personnel and system administrators to configure the content and format of a bill before presenting it to customers. A system and method provide external customers with drilldown ability, enabling them to view both summary and detailed billing data and related information necessary to understand and pay the bill.

In one embodiment, a Bill Presentment Architecture (BPA) comprises a new foundation layer within a receivables environment that separates bill presentment from transaction accounting. The BPA provides flexible content and layout configuration and grouping capabilities. The BPA also allows other electronic business applications to be identified as data sources. In identifying other source applications, the physically presented bill is no longer limited to information contained within the receivables environment. Further, the BPA allows a user to drill down to detailed information in the source applications when viewing the bill online via a receivables or another calling application.

One embodiment provides a computer implemented method for generating a bill comprising receiving a request to generate the bill and responsively loading a template and finding a data source. In response to loading the template a user interface is generated. In response to finding the data source, data corresponding to information to be presented on the bill is retrieved. The, in response to generating the user interface and retrieving the information, the data retrieved and the user interface are bound. A resulting bill is then outputted.

The request can be a message in a hypertext transfer protocol (HTTP). The bill can present the information within it in a summary form and can be rendered the bill in Hypertext Markup Language (HTML). Within the bill is a hyperlink in one embodiment. The hyperlink allows a user to drilldown from the summary information presented on the bill to corresponding more detailed information.

The data source comprises an associated application. In one embodiment, the data source can be a number of applications; one a primary application and another, a supplementary application. In one embodiment, the primary application can be a receivables application. The supplementary application integrates with the primary application. The supplementary application in some embodiments can be selected from a contract services application, an order management application, a projects application, and a property manager application.

One embodiment provides a computer usable medium having a computer readable program code embodied therein for causing a computer system to execute the processes described above.

One embodiment provides a computer based system for presenting a bill rendered in HTML comprises an integration layer, for integrating a data source with the system, a template layer receiving data from the integration layer, for generating a template for the bill, and a presentation layer receiving data from the integration and template layers, for generating and presenting the bill.

In one embodiment, the integration layer comprises a source registration module for registering the data source, and an application integration module receiving data from the source registration module, for integrating the functionality of the data source with the template and presentation layers.

In one embodiment, the template layer comprises a template management module for creating and updating a template for the bill, and a template assignment module receiving data from the template management module, for assigning the template. In one embodiment, the presentation layer comprises a presentation module for communicating a user request to the template layer, to receive data from the integration and template layers, and in response to receiving the data, to prepare and display the bill.

In one embodiment, the data can be meta-data and actual billing data. The meta-data comprises information for laying out a content area of the bill and information about an item included thereon. The actual billing data comprises information requested by the user, which is retrieved by the data source.

In a computer based system for presenting a bill rendered in HTML, one embodiment provides a computer controlled programming tool having a GUI and comprising a number of windows (e.g., HTML pages). These windows provide an interactive means for creating a template for the bill, assigning the template, and presenting the bill. A corresponding code generator for generates program code, based on the interactions with these windows and correspondingly programs a programmable bill presentation system to generate the bill. Each window described can comprise a number of windows, each providing an individual functionality.

BRIEF DESCRIPTION OF THE DRAWINGS

The accompanying drawings, which are incorporated in and form a part of this specification, illustrate embodiments of the invention and, together with the description, serve to explain the principles of the invention.

FIG. 3B is a flowchart of the steps in a method for searching a template, according to one embodiment of the present invention.

FIG. 3C is a flowchart of the steps in a method for creating and searching content items, according to one embodiment of the present invention.

FIG. 3I depicts an on-screen display window for selecting lines and tax content for a primary page, according to one embodiment of the present invention.

FIG. 3K depicts an on-screen display window for selecting content for a details page, according to one embodiment of the present invention.

FIG. 3L depicts an on-screen display window for updating properties corresponding to a details page, according to one embodiment of the present invention.

FIG. 3N depicts an on-screen display window for searching a template, according to one embodiment of the present invention.

FIG. 3O depicts an on-screen display window for selecting a transaction, according to one embodiment of the present invention.

FIG. 3P depicts an on-screen display window for displaying a sample of a bill, according to one embodiment of the present invention.

FIG. 3Q depicts an on-screen display window for creating a content item for a template, according to one embodiment of the present invention.

FIG. 3R depicts an on-screen display window for searching a content item, according to one embodiment of the present invention.

FIG. 4C is a flowchart of a process for searching an assignment rule, according to one embodiment of the present invention.

FIG. 4D is a flowchart of a process for searching an assigned template, according to one embodiment of the present invention.

FIG. 4E depicts an on-screen display window for creating a rule for assigning a template, according to one embodiment of the present invention.

FIG. 4F depicts an on-screen display window for assigning a template to a rule on a temporal basis, according to one embodiment of the present invention.

FIG. 4H depicts an on-screen display window for searching for an assignment rule, according to one embodiment of the present invention.

FIG. 5A1 is a flowchart of a process for registering and searching a source application, according to one embodiment of the present invention.

FIG. 5A2 is a flowchart of a process for creating and searching a drilldown URL, according to one embodiment of the present invention.

FIG. 5B depicts an on-screen display window for creating a URL, according to one embodiment of the present invention.

FIG. 6B depicts an on-screen display window for displaying a presented bill comprising a first level billing line, according to one embodiment of the present invention.

FIG. 6C depicts an on-screen display window for displaying a second level of a billing line corresponding to a bill, according to one embodiment of the present invention.

FIG. 6D depicts an on-screen display window for displaying details corresponding to a bill, according to one embodiment of the present invention.

DETAILED DESCRIPTION OF THE INVENTION

Figure 1:
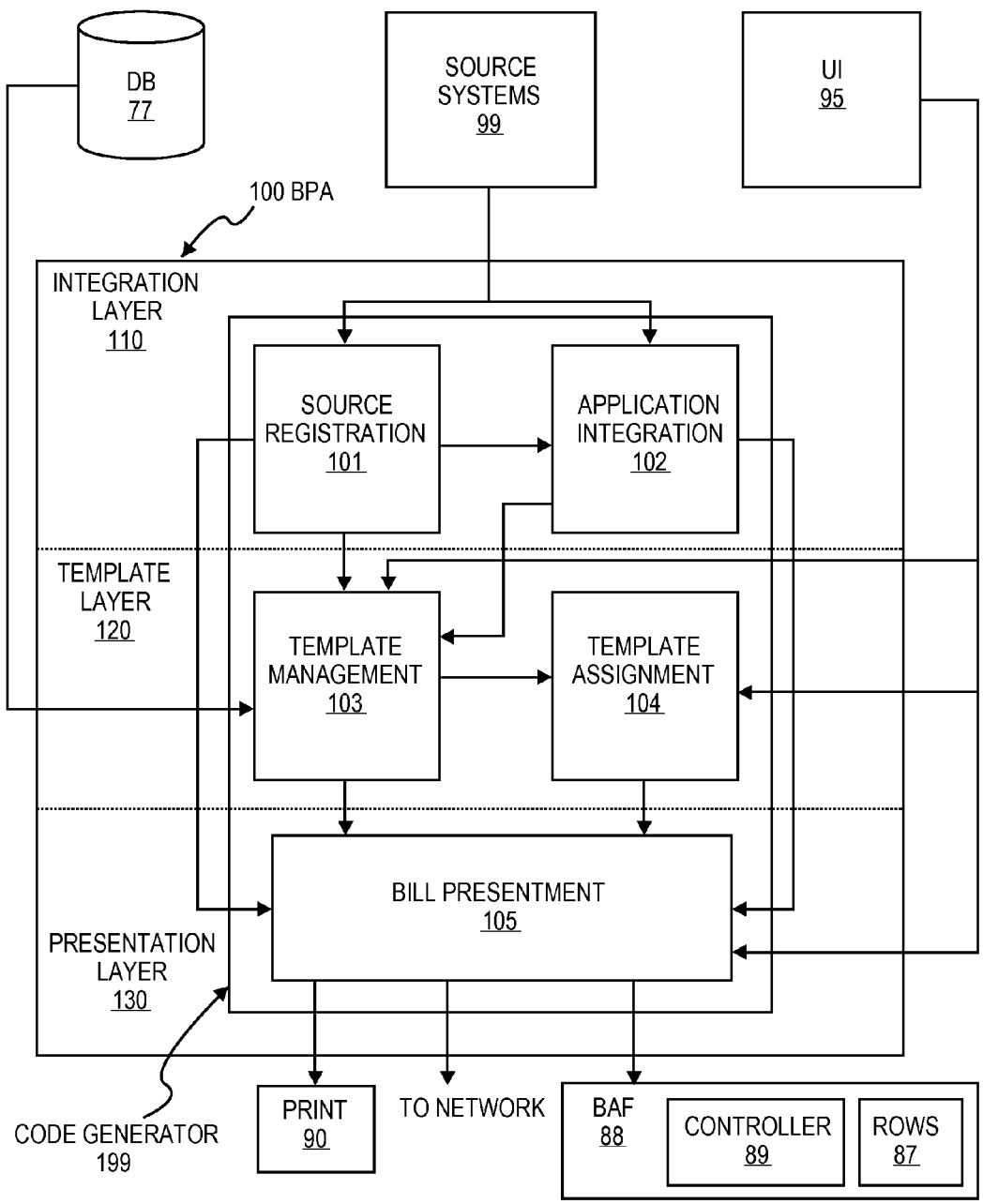
FIG. 1 depicts a high level modular overview of a bill presentment architecture (BPA) according to one embodiment of the present invention.

An architecture and method for bill presentment using a web-based tool is disclosed. Reference will now be made in detail to several embodiments of the invention, examples of which are illustrated in the accompanying drawing figures. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, one of ordinary skill in the art will realize that embodiments of the present invention may be practiced without these specific details. In other instances, well-known methods, procedures, networks, systems, components, and circuits have not been described in detail so as not to unnecessarily obscure aspects of the present invention.

A computer system that embodies the architecture for bill presentment using a web-based tool can comprise any kind of computer system. For example, the computer system can comprise a workstation computer system, a personal computer system, a specialized server computer system, a mainframe computer system, or a supercomputer system. Modules of the system implementing the architecture for bill presentment can be implemented in software, firmware, and/or hardware or any combination of software, firmware, and/or hardware.

In one embodiment, such processes are carried out by processors and electrical/electronic components under the control of computer readable and computer executable instructions. In one embodiment, a graphical user interface (GUI) is also effectuated by such processors and components under the control of computer readable and computer executable instructions. The computer readable and computer executable instructions reside, for example, in data storage features, memory, registers and other components of the computer system deploying the architecture for bill presentment. However, the computer readable and computer executable instructions may reside in any type of computer readable medium.

Notation and Nomenclature

As used herein the following terms may have the connotations stated in this section.

"AR Invoice Lines" may refer to accounts receivables transaction lines for an invoice and denote the level of billing information that is sent to receivables for accounting purposes.

"Billing Lines" may refer to billing information for each purchased goods and service displayed on a bill. Billing lines are defined in the "Lines and Tax" region of a template. There can be multiple levels of billing lines that come from receivables or source applications.

"Billing Template" may refer to a template containing the overall layout and content as designed by billing personnel and used to present a bill.

"Primary Source Application" may refer to an application that is the primary source of billing data for a template. For instance, a receivables application can be the primary source application in the Bill Presentment Architecture (BPA) 100 herein.

"Supplementary Source Application" may refer to an application that is a supplementary source of data for a template. For instance, applications such as contract services applications, order management applications, projects applications, and property manager applications that can integrate with the receivables application for invoicing and accounting are identified as supplementary source applications in BPA 100. Such applications can provide supplementary billing data for presentment via BPA 100 without sending it through the receivables application.

"Data Source" may refer to a component of a source application. For instance, a data source can be a view or table containing data to be populated in the header/footer or lines areas. Each source application can have multiple header/footer area data sources, but only one line area data source.

"Primary Page" may refer to the main page of a bill that is presented in bill presentment. The primary page includes all the general information and billing lines of a bill. For instance, the billing lines can include the transaction lines that can be interfaced to the receivables application and the grouped lines thereof. Links from the primary page access supporting detailed information. The design of the primary page is done in a primary page design step of a template management module (e.g., template manager 103; FIG. 1).

"Details Page" may refer to a page of bill presentment that contains billing information that can be drilled down from the billing lines. In one embodiment, such details are not interfaced to the receivables application for an for accounting purpose. For instance, the design of the details page is done in a details page design step of a template management module.

"Header Region" may refer to one of several (e.g., three, in one embodiment) pre-defined regions of the billing template design page. For instance, the header region comprises a section above a "Lines and Tax" region of a billing template page. The header region can be split into multiple content areas. Header region content areas can contain any content items that are not billing line items. Information most commonly displayed in this region includes, for example, a company logo, relevant addresses, customer information, shipment information, invoice general information, and the like.

"Lines and Tax Region" may refer to another of the several (e.g., three) pre-defined regions of a billing template. For instance, the lines and tax region covers the middle portion of the template, and is designated for containing billing lines and tax specific content items.

"Footer Region" may refer to yet another of the several (e.g., three) pre-defined regions of the billing template. For instance, the footer region refers to a section below the "Lines and Tax" region of a billing template page. Like the header region discussed above, the footer region can be split into multiple content areas. Footer region content areas can contain any content items that are not billing line items. The same set of billing information available for presentment in the Header region can be made be available in the Footer region. In one embodiment, information displayed in the region includes total charges, balances, messages, and the like.

"Content Area" may refer to a building block of a billing template. For instance, users can create content areas in the header and footer regions, based on a logical grouping of content items. In one embodiment, a content area will have one layout for all its content items.

"Content Item" may refer to data attributes that can be placed in a content area. Content items can be pre-defined and user-defined. For example, pre-defined items are billing data provided by registered applications including receivables and source applications. User-defined items can be of type "Image" and "Text". Image items can be a graphic file in, for instance, a jpeg format, such that information such as a company logo can be placed upon a bill. Text items are free-form text entered by a user, such as a general message. Content items can be reused and placed in several content areas on one template.

"Page" may refer to a page of the bill being presented, or to a window that is interactive with a user for requesting information from or providing information to a computer based system for presenting a bill. For instance, the information can be requested and/or provided, for instance, by a user clicking a hyperlink displayed upon the page, clicking a checkbox, accessing and clicking a pop up, drop down, or static menu, entering textual, numerical, or graphical information, or the like.

Exemplary Bill Presentment Architecture

Exemplary Bill Presentment Architectural Overview

FIG. 1 depicts a high level modular overview of a system comprising a novel bill presentment architecture (BPA) 100 according to one embodiment of the present invention. The BPA 100 comprises a foundation layer within a receivables environment. The system comprising BPA 100 allows separation of bill presentment from transaction accounting. BPA 100 provides flexible content and layout configuration and grouping capabilities.

BPA 100 allows electronic business applications to be identified as data sources 99. In so identifying source applications 99, a bill as physically presented from BPA 100 is no longer limited to information contained within the receivables environment. BPA 100 allows a user to drill back to detailed information in the source applications 99 when viewing the bill online via a receivables or another calling application with which the user is working. BPA 100 comprises an integration layer 110, a template layer 120, and a presentation layer 130.

The Integration Layer 110 provides the data model for product teams to register data attributes related to a bill. All attributes may not be interfaced to an accounts receivable application for invoicing. Some attributes such as billing details or order/contract information may come directly from other source applications, because they are not required for accounting in the receivables application.

Whenever an invoice page is requested, integration layer 110 assimilates data from the various sources and returns them to presentation layer 130. This mechanism also allows the registered data to be configured for display on any section of the invoice. For example, the contract date for a contract service related invoice, which typically resides in a contracts related application, can be added to an invoice's header section or lines Section. Thus, the invoice header can contain information from both an accounts receivable and a contracts application.

Another advantage is the ability to drill down from an invoice line to a detail table containing attributes related to the line, but residing in a source application such as a contracts, order management, and/or projects application.

The source systems 99 are accessed by a source registration module 101, which facilitates registration of the source applications comprising source systems 99 and their attributes. The source systems 99 are also accessed, upon registration, by an application integration module 102, which gathers billing data from the registered source applications and supports grouping and drilldown capability.

In source registration module 101, information that can be selected for display on a bill comes from application specific views. In one embodiment, these application specific views comprise database views. For example, the accounts receivable application's (AR) Invoice Header view, Invoice Line view, and other standard Invoice Print views comprise the main sources for the header and billing lines information on the bill. Similarly, each source application provides database views as part of data source registration, if they have invoice related data that are not interfaced to the AR but are selectable for inclusion in the presented bill.

For each application, the views and items related to providing billing information that are not interfaced to the AR application register with BPA 100 through registration module 101. Registration module 101 associates each view with a certain region of the billing template. All these views and their select column list will be registered via LOADERS into metadata tables of the BPA 100:

AR_BPA_DATA_SOURCES
and
AR_BPA_ITEMS.

In one embodiment, BPA 100 supports registration of applications that are commercially available by Oracle, Inc., a corporation in Redwood Shores, Calif.

Source registration module 101 registers views containing billing information from the AR application invoice header, invoice line, payment, credits, finance charge. Source registration module 101 also registers views from the AR application containing balances in the AR_BPA_DATA_SOURCES table. These views comprise views containing billing information to be displayed at the header level and views containing billing information to be displayed at the Billing Lines level.

Source registration module 101 registers views containing billing information from the other source applications in their AR_BPA_DATA_SOURCES tables. These views comprise views containing billing information to be displayed at the header level, views containing billing information to be displayed at the Billing Lines level, and views containing billing information to be displayed at the Details level.

In one embodiment, information registered at the header level can be placed anywhere on the bill except the Lines and Tax section. For certain source applications, such as a contract for services application, if source registration module 101 needs different sets of detailed information for different transaction lines because they are for different types of services, multiple views for different details can be used.

For each view registered by the source application, a list of item names is provided and registered in a AR_BPA_ITEM table. The display level of an item on the bill is determined by its associated view's display level during registration by source registration module 101. Where there are items in the views that are not candidates for the presented bill but can be used as an attribute for assigning templates to customers, they are registered in the AR_BPA_ITEM table as well.

Template layer 120 provides connection to a UI 95 for users to create or update a billing template. Template layer 120 contains information relating to the page layout content areas on an invoice, content items to be placed in the content areas, selected from a registered source application's data sources, and formatting information for each item and content area.

A template manager 103, accessible in one embodiment via a user interface (UI) 95, provides the ability for users to design billing templates, thus selecting data elements that will be rendered from the registered source applications and configure the layout of a bill. A template assignment module 104 provides the ability for users, via UI 95 or another modality, to define rules and assign different templates to specific customers or customer categories. BPA 100 thus allows billing personnel to create multiple billing templates based on customer need using the template management tool 103.

Template manager 103 allows layout design and data positioning, display of pre-defined billing data from a receivables application, a receivables transaction flexfield, a contract for services application, and other applications including third-party applications. Template manager 103 also allows display of custom images and messages, flexible tax formatting, user enabled hyperlinks, and interactive preview with real-time data. Further, template manager 103, through template assignment module 104 assigns billing templates to different customers or customer categories based on user defined rules and effective dates.

Presentation layer 130 is mainly responsible for communicating user requests to template layer 120 and to prepare and display a bill once data is returned. Data returned by a server 91 is comprises various kinds of information. The information returned comprises meta-data, which provides information for layout content area and item information, both in terms of data source of the items as well as placement and formatting of the content areas and items on the page. The information returned also comprises actual billing data requested by the user, which can come from any available data source.

A bill presentment module 105 receives input from source registration module 101, application integrator 102, template manager 103, and template assignment module 104. Integrating and processing these inputs together, bill presentment module 105 create a physical bill, such as via a print modality 90, and/or renders a bill online via a network.

Presentation layer 130 captures client requests for an invoice page, using for instance a business applications framework (BAF) 88, calls an business applications controller module 89 in the business applications framework 88 to process requests, and formats the page based on the meta-data and billing-data. Data retrieved are cached in the business applications framework's view object rows 87 for better performance if the same object is retrieved again.

BPA 100 can support online viewing and printing. For clarity and brevity, online bill presentment is discussed herein for explanatory purposes only. In one embodiment, the formatting capability provided by BPA 100 is for HTML level formatting. A reports application can be used with BPA 100 to perform pixel level formatting on the bill. In the present embodiment, BPA 100 assumes that one bill contains data from a receivables application, and directly from at most one other data source. In another embodiment, data can also be received directly from more than one other data source, besides the receivables application. BPA 100 can take data from any data source that contains data residing outside of an accounts receivable (AR) data schema, but which needs to be presented on the bill.

BPA 100 natively supports the construction and display by UI 95 of up to two levels of drilldown from the billing lines section of a bill. Additional levels of drilldown display, as needed, are handled natively by each source application's UI. BPA 100 allows one level of grouping above AR invoice lines. In one embodiment, BPA 100 presenting invoices from a receivables application such as Oracle Receivables™, commercially available by Oracle, Inc.

BPA 100 can be supported by technologies including, for instance, Oracle Applications eBusiness Suite Family Pack™, Oracle Applications Framework™, Extensible Markup Language (XML) Developer's Kit™ (XDK), Java Development Kit (JDK), also commercially available by Oracle, Inc., Java Runtime Environment™ (JRE), commercially available by Sun Microsystems, Inc., a corporation in Mountain View, Calif., Apache Jserv, and Java database connectivity (JDBC).

BPA 100 functions as an architectural foundation for retrieval of data from multiple data sources and provides an interface for registration of third-party data sources. In the present embodiment, BPA 100 provides progressive drilldown capability from billing lines to billing details, as well as drilldown from any hyperlinked attribute on the online bill. BPA 100 enforces security control on the level of billing details external users are allowed to view. BPA 100 allows summarized roll-up of a receivables application invoice lines to facilitate customer purchase order reconciliation and displays pertinent data and in a desired format for the customer to clearly understand the bill.

Oracle Receivables™, commercially available by Oracle, Inc., can comprise one such application of the receivables applications comprising source systems 99. In this case, BPA 100 affects the application by adding new columns:
SOURCE_DATA_KEY 1 . . . 5
and
INVOICED_LINE_ACCTG_FLAG
to "RA_INTERFACE_LINES_ALL" and "RA_CUSTOMER_TRX_LINES_ALL". Where the lines that get interfaced to the receivable application are grouped or rolled up to a summary line in the source application, the source application sends in the reference keys to the group/summary lines as well. The columns
SOURCE_DATA_KEY 1 . . . 5
are used to store the reference keys pointed back to the group/summary line in the source products. The column
INVOICED_LINE_ACCTG_FLAG
is used to indicate whether the lines are summarized or detailed lines from the source product. Autoinvoice is modified to import the columns.

The receivables application provides views to include information for invoice header, invoice line, invoice header and line flexfield attributes, payment, credits, finance charge, adjustment, payment, and balances.

Other applications comprising source systems 99 that interface to Oracle Receivables™ can also be applications commercially available by Oracle, Inc. In this case, BPA 100 affects the applications, for billing and uptake of BPA 100 for presenting a bill in the following ways.

Where there is grouping information in the source application that provides rollup information for the invoiced accounts receivable (AR) lines, a primary key of this record is passed into the receivables application when the lines are invoiced. The AR lines will be grouped under the group description for presentation.

BPA 100 provides drilldown views for billing line details. The drilldown views can be children lines that sum up to the AR invoice line or additional information related to specific items or services.

The source application registers with BPA 100 a list of displayable items (coming from the drilldown views) to be seeded in the data model comprising BPA 100. The list of displayable items is available by users to select when they design a billing template. At the time of presenting the bill, BPA engine 100 uses this information to fetch the billing data from source application.

Where there are any documents or HTML pages (e.g., a Sales Order or a Contract) that should be directed to from a content item on the presented bill (e.g., a corresponding SO number or Contract number, respectively), the destination of these documents/pages is provided.

Where an application comprising source systems 99 is iReceivables™, an invoice receivables application also commercially available by Oracle, Inc., or another application calling into BPA 100, the calling applications are affected in the following ways.

When a user clicks on an invoice number on an iReceivables™ page, BPA 100 displays the corresponding bill dynamically at runtime, instead of the current static invoice page in iReceivables™. Users can click on any hyperlink enabled billing attributes or lines to drill down to details. The bill displayed will be embedded to the iReceivables™ application UI with the original tabs and buttons retained. Any hyperlinks for drilling down to a source document that iReceivables™ would add to the invoice page will be achieved by BPA 100. Any other applications that link to the current iReceivables™ invoice page or have plans to display an invoice within their application can call and display the bill generated by BPA 100 at run time.

Source systems 99, such as a contract for services application, an order management application, a projects application, etc., can interface with a receivables application to facilitate invoicing. These source applications 99 use AR interface tables to pass contract data, order data, respectively, etc. to be represented on the invoice. Receivables accounting is done according to the level of information passed to AR. What gets presented on the bill is closely tied to revenue distribution.

In one implementation wherein the receivables application comprises Oracle Receivables™ and the contracts application comprises Oracle Contract™, both commercially available by Oracle, Inc., the following two exemplary cases show how billing data gets interfaced between the applications and how an invoice is presented based on what information gets interfaced to the receivables application.

Exemplary Invoice Presentment

Case I is exemplified in Tables 1-4, below. Table 1 represents an exemplary supplier's quote, and Table 2 below represents a corresponding customer's purchase order (PO).

TABLE 1

| Service - Gold Support | |
| --- | --- |
| Covered Product - Printer | $1000 |
| Covered Product - Copier | $1000 |
| Service - Silver Support | |
| Covered Product - Scanner | $500 |
| Covered Product - Fax | $600 |
| Covered Product - Phone | $400 |

TABLE 2

| Service - Gold Support | $2000 |
| --- | --- |
| Service - Silver Support | $1500 |

In a first exemplary scenario, product level information in the contacts application is interfaced to the receivables application to generate an AR transactions lines table, as tabulated in Table 3, below.

TABLE 3

| Invoice | Line Number | Item Description |
| --- | --- | --- |
| 101 | 1 | Covered Product - Printer |
| 101 | 2 | Covered Product - Copier |
| 101 | 3 | Covered Product - Scanner |
| 101 | 4 | Covered Product - Fax |
| 101 | 5 | Covered Product - Printer |

The relevant portion of a corresponding invoice presented from the AR application can appear as tabulated below in Table 4.

TABLE 4

| Invoice 101 | |
| --- | --- |
| Service - Gold Support | $2000 |
| Service - Silver Support | $1500 |
| Total: | $3500 |

In exemplary Case II, service level information in a contract services application is interfaced to the receivables application. Case Two is exemplified in Tables 5-6, below. Table 5 represents an exemplary accounts receivable transaction lines table.

TABLE 5

| Invoice | Line Number | Item Description |
| --- | --- | --- |
| 101 | 1 | Service - Gold Support |
| 101 | 2 | Service - Silver Support |

The related portion of the corresponding invoice is represented by Table 6, below.

TABLE 6

| Invoice 101 | |
| --- | --- |
| Service - Gold Support | $2000 |
| Service - Silver Support | $1500 |
| Total: | $3500 |

Case I exemplifies a scenario in which companies want to account separately for different elements of a sale (see table 3), but want to bill customers for one bundle of goods or services. Further, if there is a purchase order involved in the transaction, the customer expects that the bill will closely mirror the PO, which may only have the service level information (see table 2). Receiving a bill like Invoice 101 (see table 4) containing many detailed lines may confuse them. However, conventional receivables applications can have difficulty presenting the summary level information if it is not interfaced to AR.

As in Case II, other companies have many detailed transaction lines that, for accounting purposes, are grouped together and ultimately hit only one revenue account and one receivable account. In these cases, users (e.g., deploying companies or other entities) can choose to send only summary level information into the receivables application (e.g., Table 5). However, the customer receiving the bill is not only interested in seeing the summary of all their transactions (e.g., as in table 6), but the detail information of what makes up the summary charges as well.

Conventionally, because the transaction details are not passed into the receivables application, they cannot be presented on the bill. In this case, these detailed child lines cannot be produced from the receivables application because they are not required for revenue recognition and therefore reside in the source applications that are outside of the data schema of the receivables application. BPA 100 however functions in one embodiment to achieve this presentation by integrating applications in application integrator 102.

Where there are group categories for the AR invoice lines BPA 100 allows a user (e.g., a deploying company) to display them on the invoice to match their quote or their customers' purchase order. Group categories reside in the source applications of source systems 99. Group categories are not interfaced to the receivables application (AR), for instance, because they are not required for accounting. The level of information that is interfaced to AR is typically the level where accounting occurs. This billing information becomes the AR invoice lines that get displayed. In order to retrieve and display the grouped lines on the presented bill, the AR application is modified to store the reference keys to point back to the grouped lines information in the source applications. For instance, one exemplary receivables application, Oracle Receivables™ (commercially available by Oracle, Inc.), is thus modified: its Autoinvoice Interface table "RA_INTERFACE_LINES_ALL" and permanent table "RA_CUSTOMER_TRX_LINES_ALL" are changed to store the reference keys to point back to the grouped lines information in the source applications.

In the present exemplary implementation, new columns "SOURCE_DATA_KEY 1 . . . 5" and "INVOICED_LINE_ACCTG_FLAG" are added to "RA_INTERFACE_LINES_ALL" and "RA_CUSTOMER_TRX_LINES_ALL". Where the lines that get interfaced to AR are grouped or rolled up to a summary line in the source application, the source application sends in the reference keys to the group/summary lines as well. The columns "SOURCE_DATA_KEY 1 . . . 5" are used to store the reference keys pointed back to the group/summary line in the source applications. The column "INVOICED_LINE_ACCTG_FLAG" is used to indicate whether the summarized lines or detailed lines in the source application are sent to AR if either of them can be interfaced.

During bill presentment, the AR lines for each invoice are grouped using the "SOURCE_DATA_KEY 1 . . . 5". The description for the summary lines are retrieved from source applications and displayed on the presented bill as a separate HTML table. The description for the summary lines thus becomes the top level billing lines in the Lines and Tax region of the presented bill. A user can then click on a grouped billing line's hyperlink and drill down to the AR lines that make up that group.

The grouped billing lines share the same columns as the billing lines that correspond to the AR invoice lines. For instance, Group Description is displayed into the same description column as the Billing Line. Similarly, Summarized Extended Amount is aggregated over the invoice lines belonging to the group, using the extended amount value. Other Information Pertaining to the Summary Level is displayed by adding additional columns for information at the grouped billing lines level. These added columns are shared by billing lines with data being null or not null. Continuing with the exemplary Case I above, this is explained with reference to Tables 7-11, below.

Table 7 exemplifies a billing lines table in a source application (e.g., prior to invoicing).

TABLE 7

| Billing Line Identity (referenced by source_data_key 1 column of ra_customers_trx_lines) | Line Description |
| --- | --- |
| 1 | Service - Gold Support |
| 2 | Covered Product - Printer |
| 3 | Covered Product - Copier |
| 4 | Service - Gold Support |
| 5 | Covered Product - Scanner |
| 6 | Covered Product - Fax |
| 7 | Covered Product - Phone |

Table 8 exemplifies a corresponding Transaction Lines Table with new columns from an accounts receivable application.

TABLE 8

| Invoice | Line Number | Transaction Context | Item Description | Source Data Key 1 | Source Data Key 2 |
| --- | --- | --- | --- | --- | --- |
| 101 | 2 | Contracts for Services Application | Covered Product - Printer | 1 | |
| 101 | 3 | Contracts for Services Application | Covered Product - Copier | 1 | |
| 101 | 5 | Contracts for Services Application | Covered Product - Scanner | 4 | |
| 101 | 6 | Contracts for Services Application | Covered Product - Fax | 4 | |
| 101 | 7 | Contracts for Services Application | Covered Product - Phone | 4 | |

Table 9 exemplifies corresponding Grouped Invoice Lines with Group Description.

TABLE 9

| Sequence | Description | Quantity | Unit Price | Amount |
| --- | --- | --- | --- | --- |
| 1 | Service - Gold Support | | | $2000 |
| 2 | Service - Silver Support | | | $1500 |

In the Description column of Table 9, "Service—Gold Support" and "Service—Silver Support" are hyperlinks, denoted for example by blue-underlined blue-colored font, to distinguish the hyperlinks from normal text, rendered without underlining in black font. When a user "clicks" on the hyperlink for to any group, BPA 100 retrieves the corresponding invoice lines for that group.

Table 10 exemplifies Billing lines for the group linked by the hyperlink of Table 9: "Service—Gold Support".

TABLE 10

| Service - Gold Support | | | | |
| --- | --- | --- | --- | --- |
| Sequence | Description | Quantity | Unit Price | Amount |
| 1.1 | Covered Product - Printer | 1 | $1000 | $1000 |
| 1.2 | Covered Product - Copier | 1 | $1000 | $1000 |

Similarly, Table 11 exemplifies Billing lines for the group linked by the hyperlink of Table 9: "Service—Silver Support".

TABLE 11

| Service - Silver Support | | | | |
| --- | --- | --- | --- | --- |
| Sequence | Description | Quantity | Unit Price | Amount |
| 2.1 | Covered Product - Scanner | 1 | $500 | $500 |
| 2.2 | Covered Product - Fax | 1 | $600 | $600 |
| 2.3 | Covered Product - Phone | 1 | $400 | $400 |

Where some AR lines do not have group information like others on an invoice, these AR lines are displayed along with the grouped lines of other AR lines in the same table as the highest level of billing lines.

BPA 100 provides online drilldown capability, such as the ability for a user to drilldown from billing lines. Users click on the top-level billing lines and progressively drill to further billing details. The top level billing lines may be the AR invoice lines or the rolled-up group from the AR invoice lines. Each level of drilldown will result in a separate display page within the same window. Each source application registers with BPA 100 a list of parameters for the drilldown views. Based on the parameter values passed to the AR application, BPA 100 goes to the registered application views to retrieve billing details for display on the bill. A hypertext link is provided on the invoice line description, allowing a user to click on the hyperlink and drill down. Parameters for each application view are stored in the column "param1 . . . param20" in a BPA_DATA_SOURCES table.

BPA 100 also provides the ability for a user to drill to another web page or document, such as by clicking on any displayed attributes on the bill (e.g., in the Lines section or outside the Lines section of the bill), where the attribute is hyperlink enabled. These web pages or documents can be of any application. Users configure the URL of these web pages or documents in Configuration UI 95 for BPA 100.

Exemplary Template Management Functionality

Template management module (e.g., template manager) 103 allows a user to create, update, duplicate and preview bill templates (templates), and to view existing template content items and create custom content items. Using UI 95, a user can have template Management module 103 create an invoice template from scratch, or copy an existing user-defined or pre-defined invoice template. The user can specify the template content and layout, by adding, removing, and formatting content areas and content items from any number of registered data sources. The user can also update the content and layout of existing templates. Completed templates can then be previewed using actual customer transactions chosen by the user.

Templates are made up of content areas. Within each content area, the user can place pre-defined content items chosen from a list of available items from the registered data sources. Pre-defined content items include data items, which comprise data taken directly from the data source. Pre-defined content items also include message items, which comprise messages stored in a database 77. The user can also create and incorporate custom content items. The custom content items can comprise, for example, text (e.g., free-form text entered by the user) and an image (e.g., any graphic, such as a company logo, a holiday image, etc.).

Figure 2:
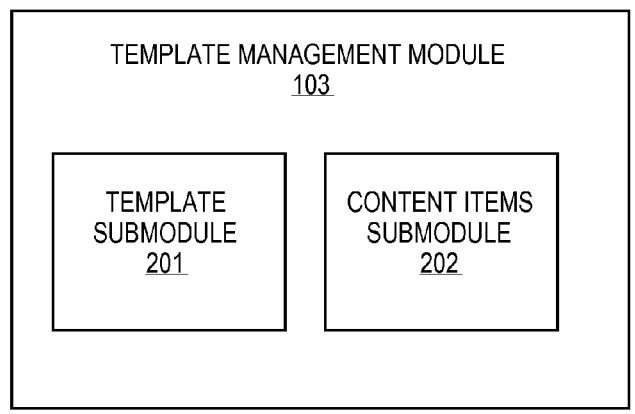
FIG. 2 depicts a template management module, according to one embodiment of the present invention.

FIG. 2 shows an exemplary template manager 103 as comprising two submodules: a templates submodule 201 and a content items submodule 202. Templates submodule 201 allows the user to create templates from scratch.

Figure 3A:
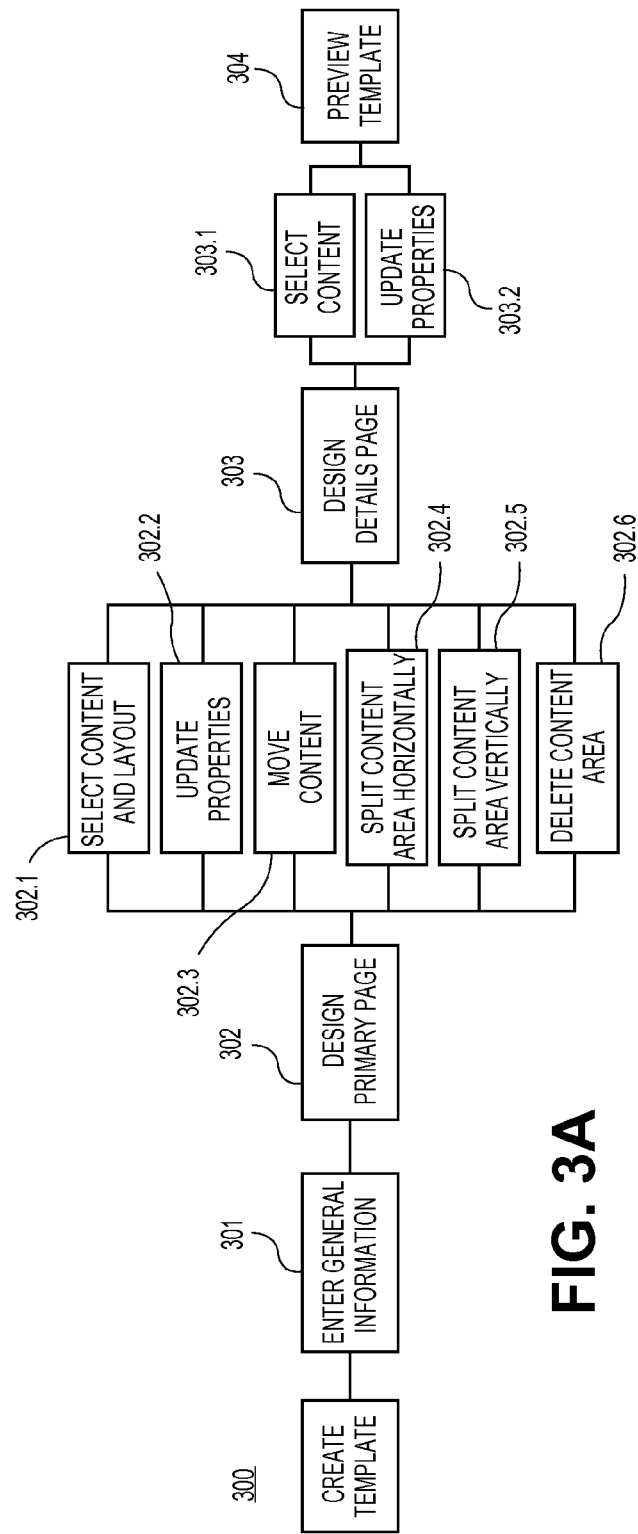
FIG. 3A is a flowchart of the steps in a method for creating a template, according to one embodiment of the present invention.

FIG. 3A is a flowchart of a computer implemented process 300 for creating a template, according to one embodiment of the present invention. Process 300 is performed, in one embodiment, using a web based tool and graphical user interface (GUI). Process 300 begins with step 301, wherein a user enters general information, such as a name and description of the template.

In step 302, the user designs the primary page of the template. In one embodiment, the primary page is fashioned from three starting regions: a header, body, and footer. In one embodiment, step 302 comprises several sub-steps, some of which can be optional, which are performed using the GUI and an interactive webpage.

For instance, in sub-step 302.1, content and layout for the primary page is selected. In optional sub-step 302.2, primary page properties are updated. In optional sub-step 302.3, content is moved in the primary page. In optional sub-step 302.4, the content area is split horizontally. In optional sub-step 302.5 the content area is split vertically. In optional sub-step 302.6, a content area is deleted.

In step 303, the details page is designed. In one embodiment, step 303 comprises several sub-steps, some of which can be optional, which are performed using the GUI and an interactive webpage. For instance, in sub-step 303.1, content for the details page is selected. In optional sub-step 302.2, details page properties are updated. In step 304, the user updates the template is previewed, completing process 300.

FIG. 3B is a flowchart of a computer implemented process 310 for searching a template, according to one embodiment of the present invention. Process 310 is performed, in one embodiment, using a web based tool and graphical user interface (GUI). Process 310 begins with step 311, wherein the template is updated, which can comprise step 312, wherein general information is updated. Process 310 next performs step 302 (e.g., of process 300; FIG. 3A), wherein the primary page is designed.

As in process 300, in one embodiment, step 302 comprises several sub-steps, some of which can be optional, which are performed using the GUI and an interactive webpage. In sub-step 302.1, content and layout for the primary page is selected. In optional sub-step 302.2, primary page properties are updated. In optional sub-step 302.3, content is moved in the primary page. In optional sub-step 302.4, the content area is split horizontally. In optional sub-step 302.5 the content area is split vertically. In optional sub-step 302.6, a content area is deleted.

Process 310 next performs step 303 (e.g., of process 300; FIG. 3A), wherein the details page is designed. In one embodiment, step 303 comprises several sub-steps, some of which can be optional, which are performed using the GUI and an interactive webpage. In sub-step 303.1, content for the details page is selected. In optional sub-step 302.2, details page properties are updated.

In step 304, the user updates the template is previewed as in Process 300, wherein process 310 can be complete. In step 313, the template is duplicated, wherein process 310 can be complete.

In step 314, an interactive preview is selected. In step 315, a transaction to be previewed is chosen. In step 316, the transaction chosen is previewed, wherein process 310 can be complete.

FIG. 3C is a flowchart of a computer implemented process 320 for creating and searching a content item, according to one embodiment of the present invention. Process 320 is performed, in one embodiment, using a web based tool and graphical user interface (GUI). Process 320 begins with step 321, wherein the content item is created. In step 322, the content item is searched. In optional step 323, the content item is updated. In optional step 324, a content item is deleted. Process 320 can be complete upon completion of steps 321, 323, or 324.

Exemplary System Provisions and GUI

In one embodiment, template management and other aspects of the BPA 100 provides information to a user in the form of web content that allows a user to interact with a computer system for the generation, use, and modification of templates and other aspects. Upon providing this information to a user, a computer-controlled programming tool in one embodiment allows the user to take corresponding action and/or input further information using a corresponding interface, which can be a GUI, to generate, modify, or use templates.

With information provided to a user via a series of interactive windows and/or webpages, etc. on a monitor, the GUI allows the user to input information to the system using, for example, a keyboard, another alphanumeric input device, and/or a mouse or similar device. Upon receiving such inputs, a corresponding code generator 199 generates corresponding program code for programming a programmable communication plan generation tool. In one embodiment, a template is generated by the tool, which a user can apply to create and store the template in an electronic format. In one embodiment, these steps and/or other consideration and tasks can be represented by steps and processes described above.

The template so generated can then be promulgated by printing, sharing, downloading, and/or saving. Advantageously, this allows the template to be referenced and/or used at a later time, and/or repetitiously and by multiple users. This has the advantage of saving time, effort, and expense.

Figure 3D:
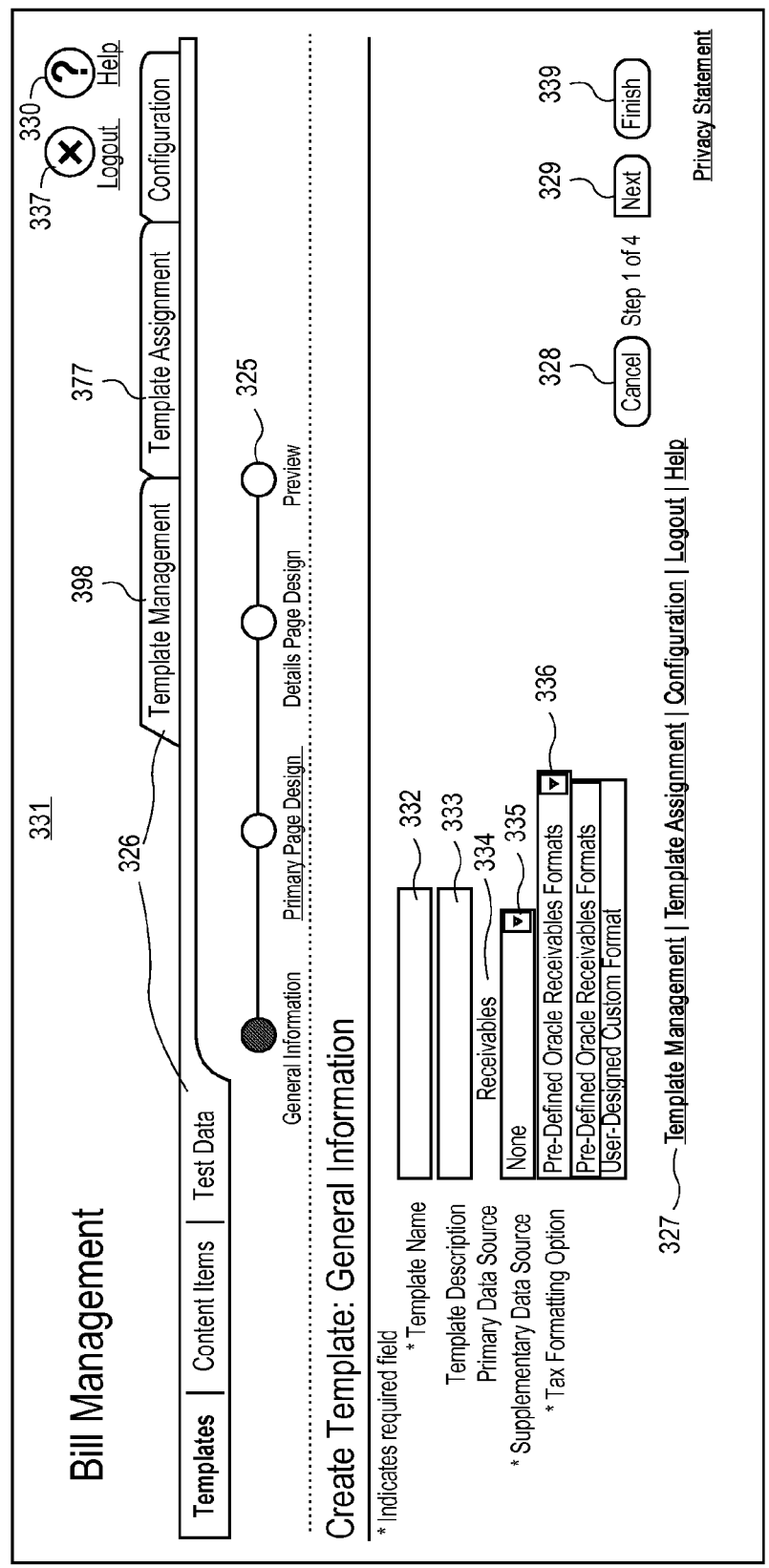
FIG. 3D depicts an on-screen display window for inputting general information, according to one embodiment of the present invention.

FIG. 3D depicts an exemplary web page 331 for use with a GUI for creating a template (e.g., process 300; FIG. 3A). A user can enter a name and description of the template into text fields 332 and 333, respectively. In one embodiment, the name is required and is unique; the description is optional and not necessarily unique. The user also chooses the supplementary data source in text field 335, which can be filled by a selection from a drop down or pop up menu. The supplemental data source comprises an application other than the receivables application, listed in field 334 as the primary data source. Supplemental data comprises data retrieved for inclusion in the template.

The choice of supplemental data source dictates available content items that can be added to the template (e.g., process 320; FIG. 3C). A value of "None" may be selected; meaning the only data source for the template is the receivables application, e.g., the primary data source. Thus, a supplementary data source is chosen where billing data is needed from an application other than the receivables application and/or flex fields from the receivables application are needed on the template.

The user indicates in text field 336 or from a drop down or pop up menu whether the template will use a pre-defined tax printing options from the receivables application, or whether the user will design a custom tax format. In the former case, the tax format of the template will be displayed based on the customer tax printing option, and the user will not design any tax fields. For example, if the printing option is 'European', the template will display the tax in a European format enabled by the receivables application. Thus, the tax format will be one of the printing options of the receivables application. In the latter case, the tax format of the template will be displayed based on the custom design of the user. Thus, the tax printing options of the receivables application will not be a factor in these templates. One of the tax formatting options can be a default. For instance, in one embodiment, the default templates will be of the tax format comprising the tax printing option of the receivables application. If the tax format field 336 is left blank, an error message will appear if/when the user tries to exit the page 331.

Changes can be saved. When the user clicks the "Finish" button 339, a message appears confirming the save. Button 328 allows a user to cancel changes made to page 331. Button 329*n* scrolls a user to the next page in the template design process. Button 337 allows a user to log out from the template management process. Button 338 summons a help field or page for the user. Tool bar 326 allows a user to select between template work, content item work, and/or test data, and to move between template management, template assignment, and configuration. Tabs 398 and 399 allow a user to access the functionality corresponding to template manager 103 and template assignment module 104, respectively.

Figure 3E:
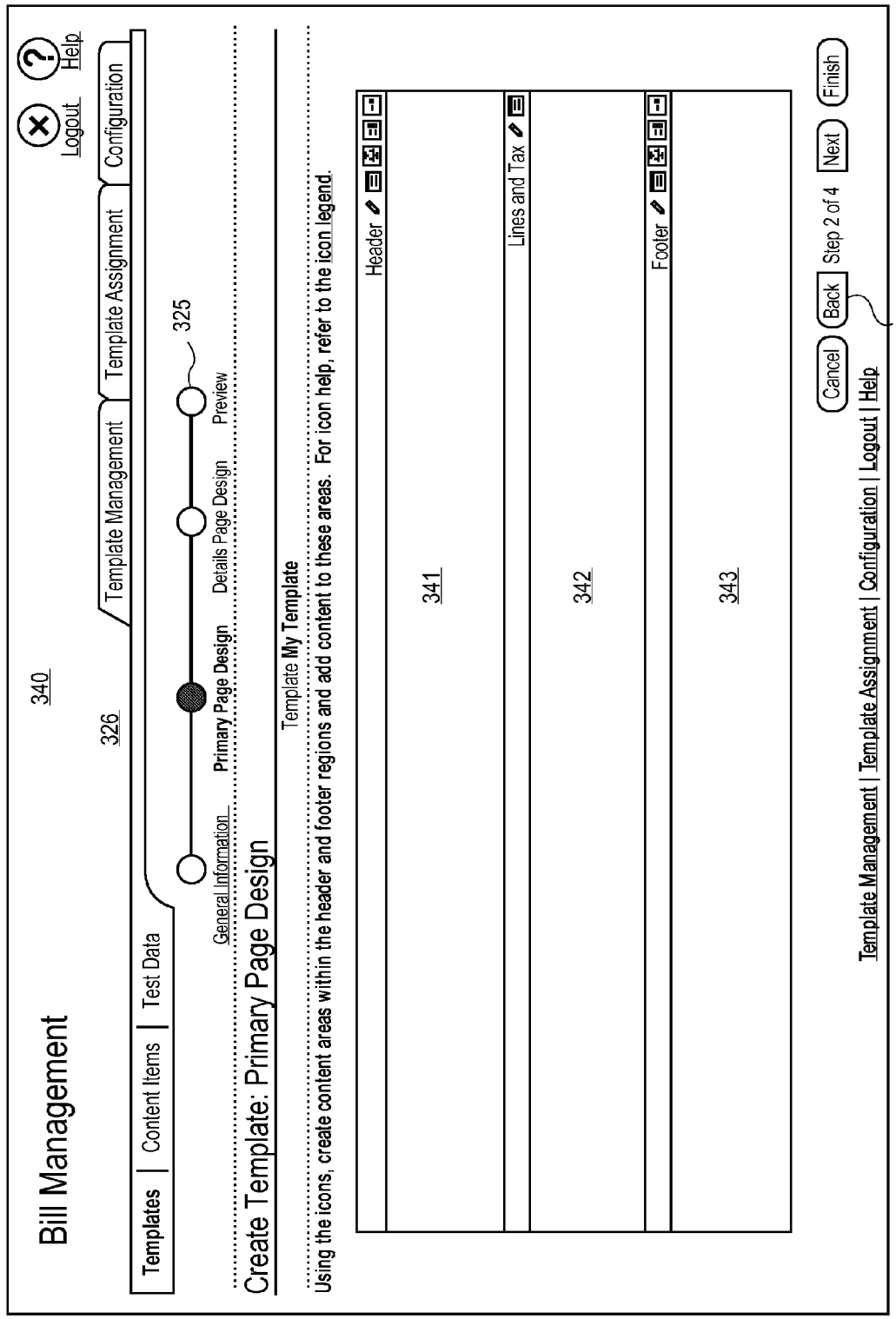
FIG. 3E depicts an on-screen display window for designing a primary page for a bill, according to one embodiment of the present invention.

FIG. 3E depicts an exemplary web page 340 for use with a GUI for designing a primary page for a template (e.g., step 302 of process 300; FIG. 3A). The user can design the primary page of the template. The user is presented with three starting regions: header 341, body (e.g., "lines and tax") 342, and footer 343. The name of the body region 342 can depend on the tax formatting option of the template.

For templates using the tax printing option of the receivables application of one embodiment, the body 342 is called "Lines" and contains only the lines table. For templates using the "Custom" tax format, the body 342 is called "Lines and Tax" and contains both the lines and tax tables.

The user can split the header and footer regions vertically and horizontally (e.g., steps 302.5, 302.4, respectively of process 300; FIG. 3A) to create numerous content areas. These content areas should be created based on a logical grouping of content that share one layout. In one embodiment, the lines and tax region cannot be divided further into content areas (e.g., because it contains specific content that can only be displayed in this region).

Figure 3F:
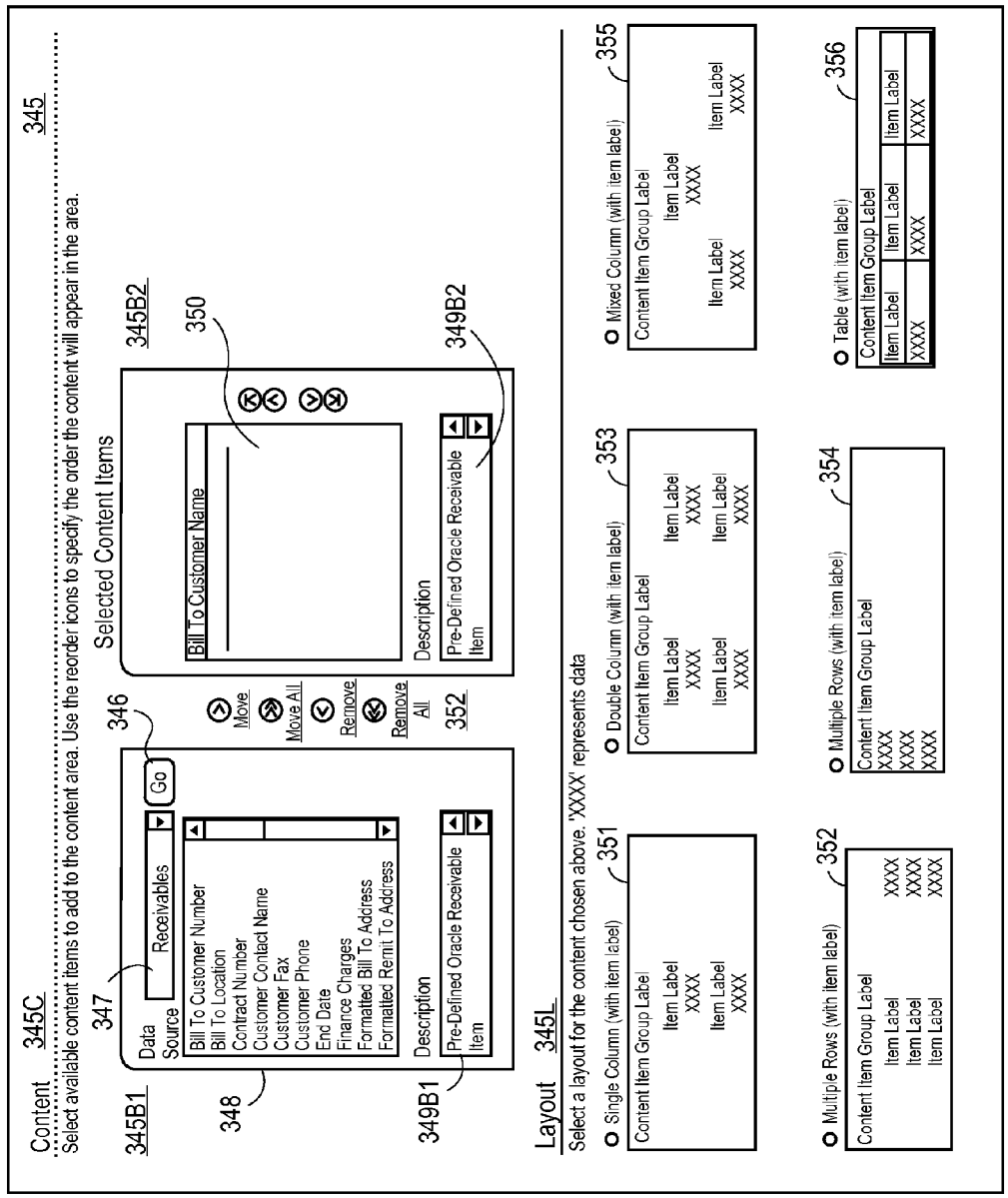
FIG. 3F depicts an on-screen display window for selecting a content item for a content area of a primary page, according to one embodiment of the present invention.

FIG. 3F depicts an exemplary page 345 for selecting content (e.g., step 303.1 of process 300; FIG. 3A). Once the content areas are created, the user can add and remove available content items to and from these areas. The "Content" section 345C of page 345 contains a shuttle box. The left box 345B1 contains all the user defined content items 348 and the pre-defined content items from the primary and supplementary data sources selected in the general information page 331 (FIG. 3D). The right box 345B2 contains just the items to be included on the template. Both boxes 345B1 and 345B2 include descriptions 349B1 and 349B2 of the items, which indicate their sources. The items are filtered via the data source, selected in field 347 and retrieved by button 346. Flex fields are included in the supplementary data source group of items.

Layout section 345L of page 345 contains several layout styles in boxes 351-356, from which the user can choose to present the content items. The order the items appear in the content area will follow the order listed in the shuttle boxes 345B1 and 345B2.

Figure 3G:
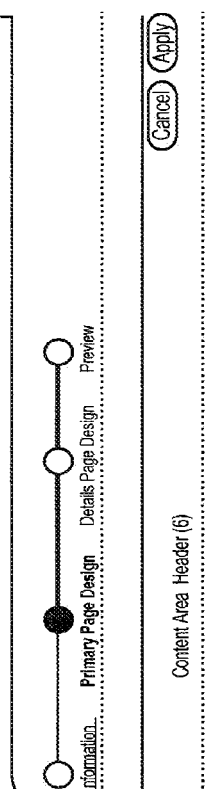
FIG. 3G depicts an on-screen display window for updating properties corresponding to a primary page, according to one embodiment of the present invention.

FIG. 3G depicts an exemplary page 360 for updating template properties (e.g., step 303.2 of process 300; FIG. 3A). Once content items and layout are chosen, the user can update the properties of both the content area and content items using page 360. To update the content area properties, the user uses the features of section 361. Here, the user can rename the content area in field 362, as well as specify its spacing and width in fields 363S and 363W, respectively.

Content items are updated using the features of section 364. For content items, the display labels are modified (including e.g., the font styles of both the data and labels), using field 365 and fields 366. Drilldown URLs can be modified using fields 367.

Figure 3H:
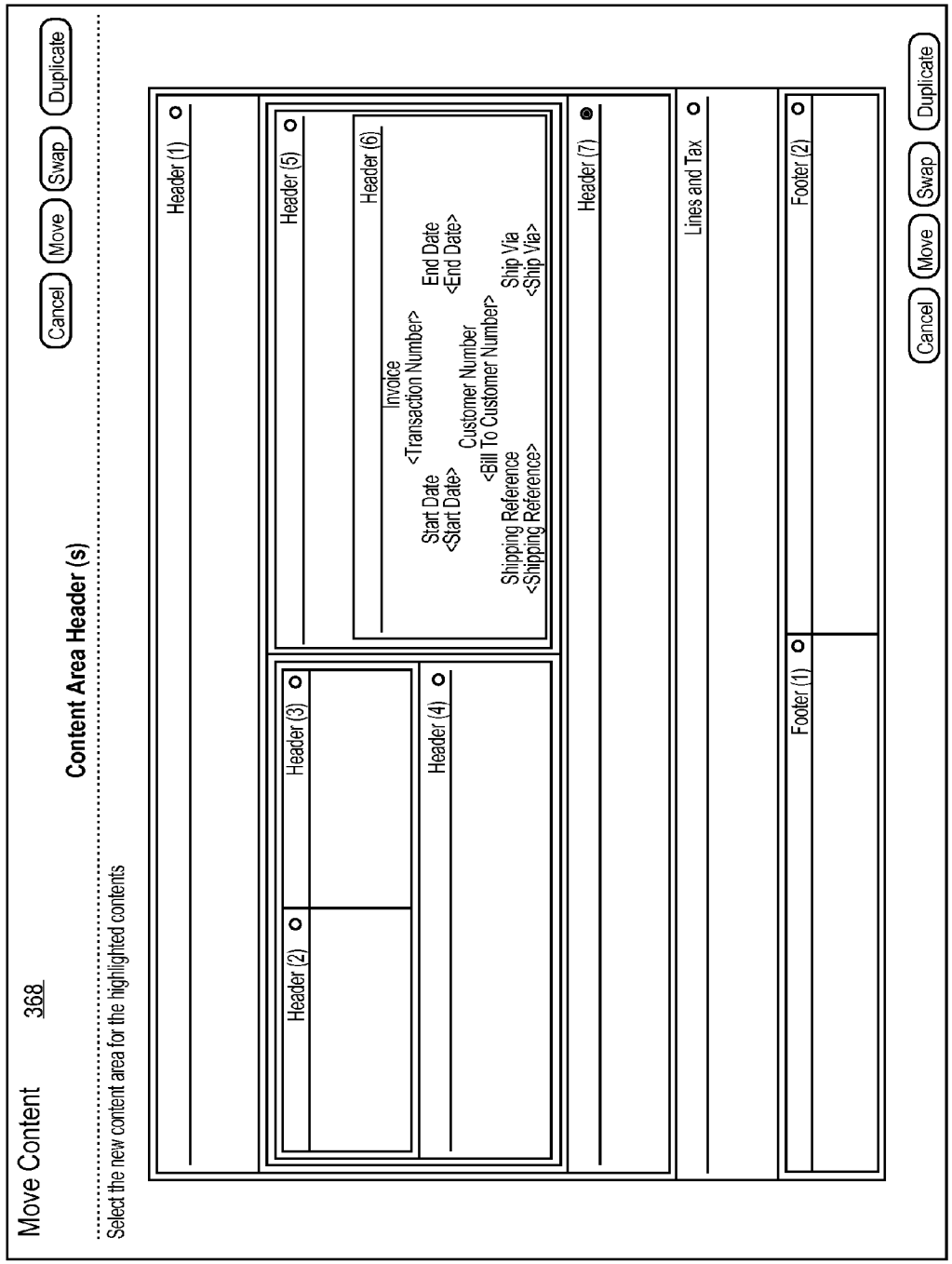
FIG. 3H depicts an on-screen display window for moving content upon a primary page, according to one embodiment of the present invention.

FIG. 3H depicts an exemplary page 368 for moving content (e.g., step 302.3 of process 300; FIG. 3A) within a template primary page, according to one embodiment of the present invention. The user can move, swap or duplicate content areas. All content items and associated layout style of the source content area will move, swap, or be duplicated to the target content area. This gives the user the flexibility of rearranging the placement of content areas that have already been designated with content items and a layout style.

FIG. 3I depicts an exemplary page 369 for selecting lines and tax content (e.g., step 302.1 of process 300; FIG. 3A) within a template primary page, according to one embodiment of the present invention. Similar to the "Select Content and Layout" page 345 (FIG. 3F) of the header and footer regions, the "Select Content" page 369 for the "Lines and Tax" region enables the user to select content items for the billing lines and for custom tax formatted templates, the content items for the summarized tax sections. Content items can be added and removed via the shuttle boxes 369B1 and 369B2. Box 369B1 contains all the user-defined content items and the pre-defined content items from the primary and supplementary data sources selected in the general information page (e.g., page 331; FIG. 3D). Box 369B2 contains items to be included on the template. Both boxes 369B1 and 369B2 include descriptions of the items, which indicate their sources.

In one embodiment, for orders taken in Oracle Order Management™ (commercially available by Oracle, Inc.), where the purchased item description on the purchase order is different from the Inventory item description in the system (e.g., BPA 100; FIG. 1), then the user's item description can be captured and entered in the Order Management™ application and passed to the Translated_Description column in the receivables application. BPA 100 checks the Translated_Description column before checking the Description column in RA_Interface_Lines_All table. Where the user's item description is found in the Translated Description column, it is displayed by BPA 100 on the bill, instead of the Inventory item description.

Some invoices contain one sales order for all items, while others can contain one sales order per item. In the former case, the sales order number can appear once in one of the header or footer content areas (e.g., header 341, footer 343 of page 340; FIG. 3E). In the latter case, the sales order numbers can appear at each line. The user selects the sales order number content item in shuttle boxes of the header/footer region (e.g., boxes 345B1, 345B2 of page 345; FIG. 3F) and the shuttle boxes 369B1 and 369B2 of the lines and tax region 369T to indicate the placement and layout of the item. BPA 100 will automatically display the sales order number(s) in the proper place, depending on the situation.

On page 369, the user can indicate if they want to display sequence numbering as the first column of the lines and drilldown tables. If checked, automatic numbers will appear sequentially. If unchecked, no numbers will appear (e.g., unless "Line Number" is selected in the receivables application for the content item is chosen in the shuttle box 369B2). The user can also choose to display the group level information as the top billing line by checking the "Display Rolled-up Receivables Transaction Lines if available" checkbox 369D. If checked, the AR billing lines will be grouped, and the totals will be summed, and displayed as grouped lines. These grouped descriptions will be linkable to the original individual AR lines. For grouped lines with multiple taxes, tax-related columns such as tax rate will display the data of the first tax line. For instance, if one grouped billing line had tax rates of 10 and 20, 10 would appear in the tax rate column of the grouped line.

For custom tax formatted templates, an option 669 P to include itemized taxes is also included on page 369. If checked, the tax per eligible line will appear below its line. Grouped lines will have grouped itemized taxes. Itemized tax lines will consist of the description column, the amount column, and any tax-related columns chosen by the user in the lines shuttle box. The lines 369L and summarized tax content items 369T are displayed in table layout, with the tax table appearing directly below the lines table.

Figure 3J:
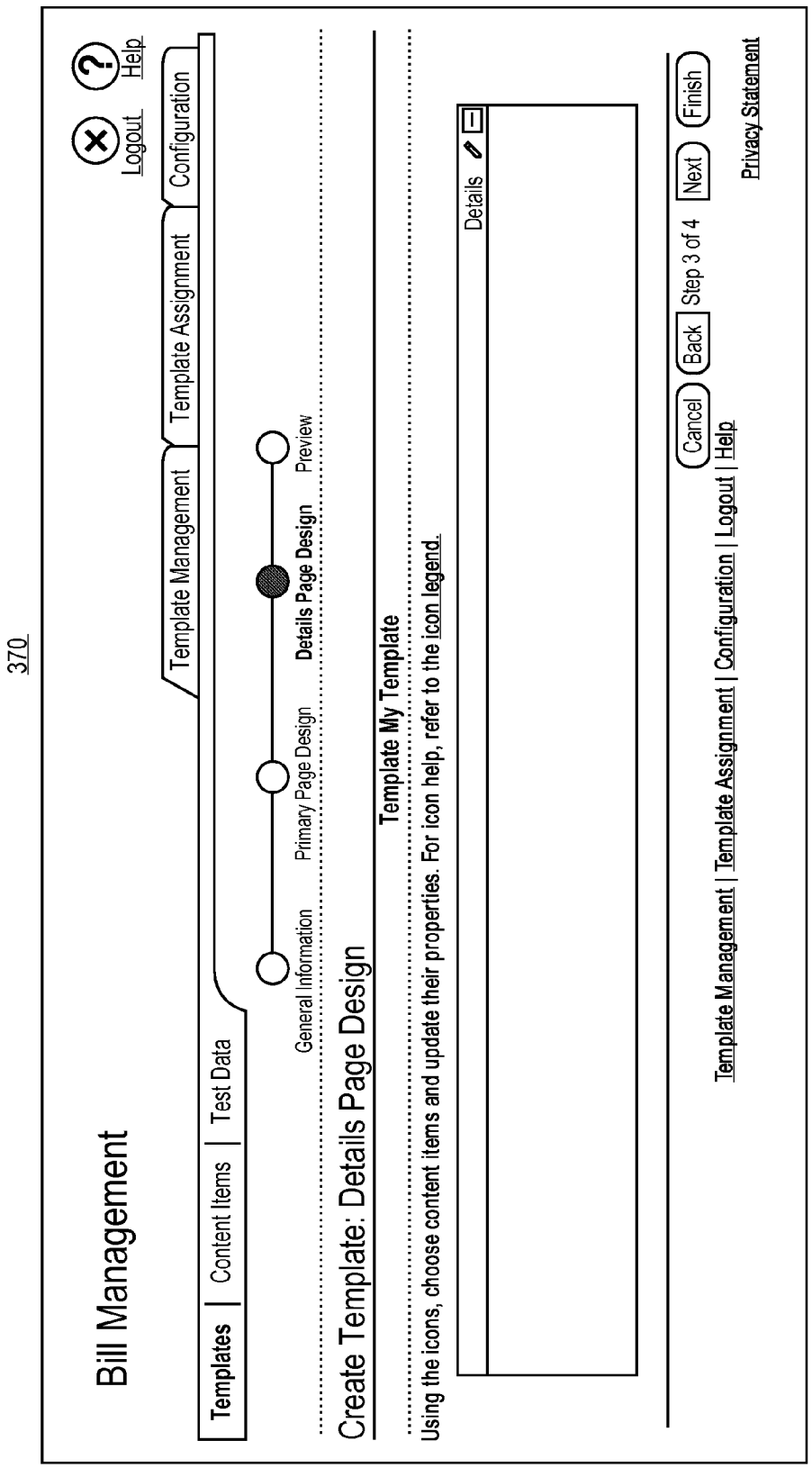
FIG. 3J depicts an on-screen display window for designing a details page for a bill, according to one embodiment of the present invention.

FIG. 3J depicts an exemplary page 370 for designing a template details page (e.g., step 303 of process 300; FIG. 3A). With page 370, the user can choose the content of the details page, as well as update its properties. In one embodiment, the details page pertains to templates having supplementary data sources. The details page is what the end user will access via the "description" content item of the primary page's billing lines table.

FIG. 3K depicts an exemplary page 371 for selecting content for a template details page (e.g., step 303.1 of process 300; FIG. 3A). The "Select Content" page 371 for the Details page enables the user to select content items for the billing lines Details region. Depending, in one embodiment, on the supplementary data source, some templates will contain more than one details table. Each table will correspond to one set of shuttle boxes 371B1 and 371B2, from which content items can be added and removed. Box 371B1 contains all the user-defined content items and the pre-defined content items from the supplementary data source selected in the general information page. Box 371B2 contains the items to be included on the template. Both boxes 371B1 and 371B2 include descriptions of the items. The content items are displayed in table layout.

FIG. 3L depicts an exemplary page 372 for updating properties for a template details page (e.g., step 303.2 of process 300; FIG. 3A). Page 372 for the Details enables the user to update the properties of the content items using fields 372F and drop down or popup windows or menus 372M. The user can specify the item display labels, as well as the drilldown URL names. In one embodiment, a user cannot modify the content area properties using page 372 (e.g., because page 372 only contains the details tables).

Figure 3M:
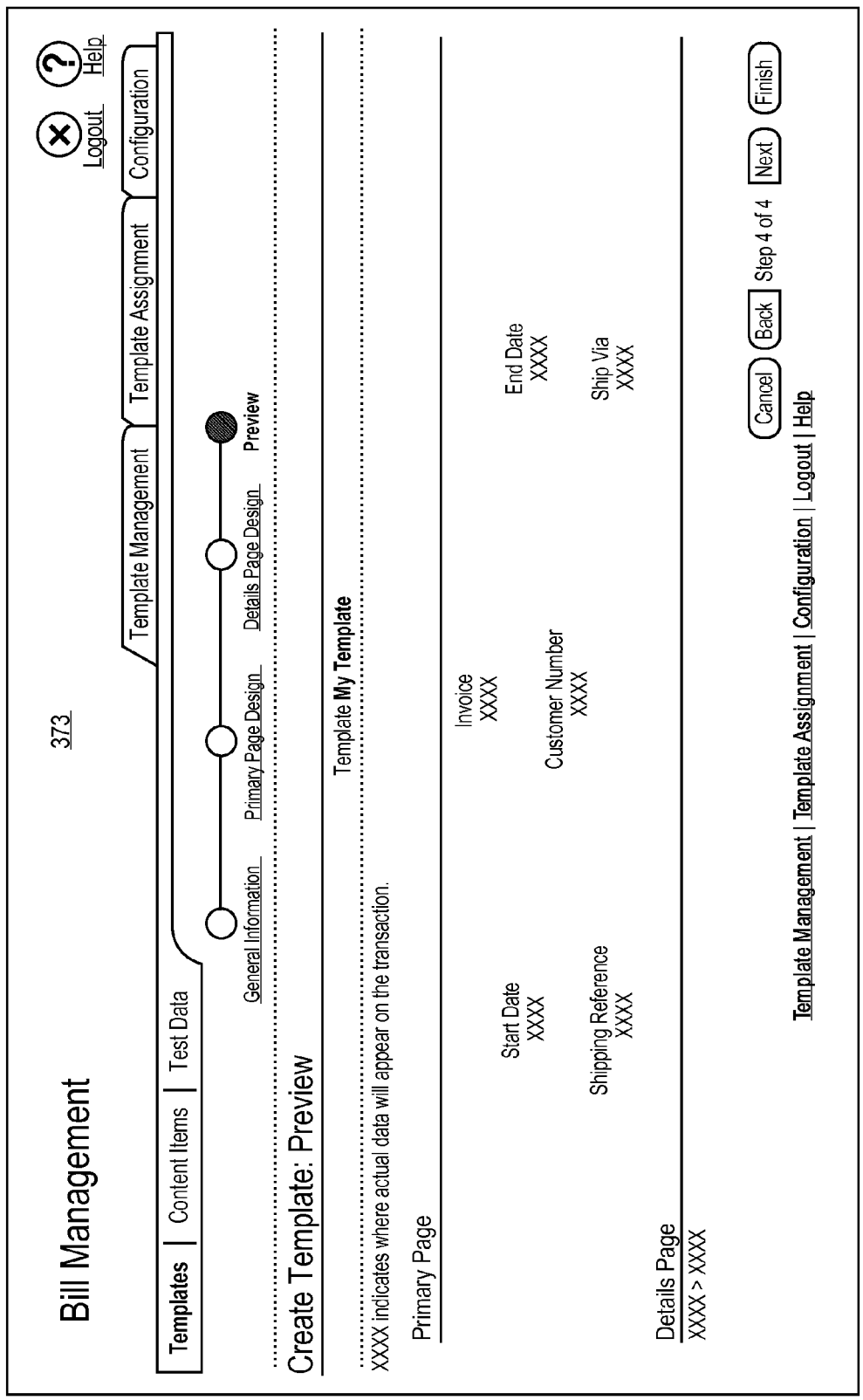
FIG. 3M depicts an on-screen display window for previewing a template, according to one embodiment of the present invention.

FIG. 3M depicts an exemplary page 373 for updating properties for previewing a template (e.g., step 304 of process 300; FIG. 3A). The user can preview the created template, which is populated with "XXXX" where actual transaction data will appear in the corresponding bill. Both the main page and details page will be shown. If changes must be made, the user can go back through the train and make appropriate updates. Once satisfied, the user can submit the template.

FIG. 3N depicts an exemplary page 374 for updating properties for searching a template (e.g., process 310; FIG. 3B). Search template 374 allows the user to search for an existing user-defined or pre-defined template based on name using field 374N, a description using field 374D, or a supplementary data source using field 374S (which can be populated by selecting from a pop up, drop down, or fixed callable menu. In one embodiment, search template 374 allows the user to search for an existing user-defined or pre-defined template based on tax format. All fields are optional; however, at least one search criteria should be populated, such as for page 374 to provide template searching functionality. Once results are displayed in results field 374R, the user can choose to update, duplicate, delete, or complete the template, or preview it with an actual customer transaction, using the appropriate selector icons 374U.

Using the appropriate icons, the user can update existing user-defined or pre-defined templates. The user can edit the name and description, as well as the supplementary data source and tax format. In one embodiment, the name is required and can be unique. The description is optional and does not necessarily have to be unique. The user can then perform all the functions to the main page and details page, as described above, such as selecting content and layout, updating properties, moving content areas around the template, and previewing the template before submission.

The user can duplicate existing user-defined or pre-defined templates. The user specifies the name and description, as well as the supplementary data source and tax format. The name is required in one embodiment and can be unique. The description is optional and is not necessarily unique. Once submitted, the template is copied as an incomplete template and can be updated via the "Update Template" flow (e.g., step 311 et seq. of process 310; FIG. 3B). The user can delete user-defined templates that have not yet been assigned, or are marked as incomplete.

Where system 100 is unable to find an object be searched for, a message appears. When user tries to delete template, a message appears to verify the user's intent prior to effectuating the corresponding delete action. When a template is deleted, a confirmation message appears. When user completes (or leaves incomplete) a template, a message appears telling the user to re-query to see the updated results table.

FIG. 3O depicts an exemplary page 375 for interactively previewing a template (e.g., step 304 of process 310; FIG. 3B). The user can preview and test the functionality of a selected template, using actual customer transactions. The preview will appear in a secondary window 376, depicted in FIG. 3P, wherein all links and drilldown capability will be fully functional. Transactions can be added and removed from the test data list using the Test Data tab 375TD. In the transaction number column 375N, the high transaction number must be greater than or equal to the low transaction number. If the user enters the higher number in the low transaction number field, an error appears. Due to the possibility existing for a large number of transactions, at least one search criteria, which can also include the customer name, should be entered in one embodiment.

FIG. 3Q depicts an exemplary page 377 for creating a content item (e.g., process 320; FIG. 3C). Page 377 allows the user to create custom content items that can be displayed anywhere outside of the lines and tax, and details regions on the template. Custom content items can be of type "text" or "image". Text is free-form entered by the user in text field (e.g., box) 377T. Images comprise information in a graphical format, such as .jpg files, which can be accessed via a corresponding item path and filename entered textually in field 377G, or browsed for amongst available files by using a browse button 377B. The user specifies content item properties. The item name is specified in field 377N. The item description is specified in field 377D. The item display label is specified in field 377L. The drilldown URL name, type, and path or text corresponding to an item is specified in field 377U.

A unique name is entered in field 377N. If the name already exists in the system 100, an error message will appear if/when the user tries to exit the page 377. If the name field 377N is left blank, an error message will appear if/when the user tries to exit the page. Upon choosing item type "Image" using checkbox 377B1, if a user does not specify a corresponding image filename, an error message will appear if/when the user tries to exit the page 377. Upon choosing item type "Text" using checkbox 377B2, if the user does not enter text, an error message will appear if/when the user tries to exit the page. When item is created, confirmation message appears.

FIG. 3R depicts an exemplary page 378 for searching content items (e.g., step 322, et seq. of process 320; FIG. 3C). Page 378 allows the user to search for an existing user-defined or pre-defined content item based on name, description, data source, and type. User-defined items can be of type "text" or "image," and pre-defined items can be of type "data" or "image." Once results are displayed, the user can choose to view, update or delete a content item by clicking appropriate icons from among icons 378S. If a user tries to delete an item that is being used in an existing template, the user will be informed that the item cannot be deleted until it is explicitly removed from the template in the "Update Template: Select Content and Layout" page (e.g., page 372; FIG. 3L). Similarly, an item that has been used in a template cannot be updated unless the template has not yet been assigned. Pre-defined content items cannot be updated or deleted.

Exemplary Template Assignment Functionality

Referring again to FIG. 1, the template assignment module 104 allows the user to assign completed templates to customers based on pre-defined or user-defined assignment rules, and invoice creation dates. Such rules comprise pre-defined criteria to which the user assigns conditional values. When these values are matched, the rule condition is met, and the template with the corresponding invoice creation dates is used. Rules are applied based on rule order, which is determined by the user. One rule could have multiple templates assigned to it, with varying invoice creation dates. Default templates are assigned via pre-defined rules for each application. These rules can be applied to any template to make it a default for a particular application.

Figure 4A:
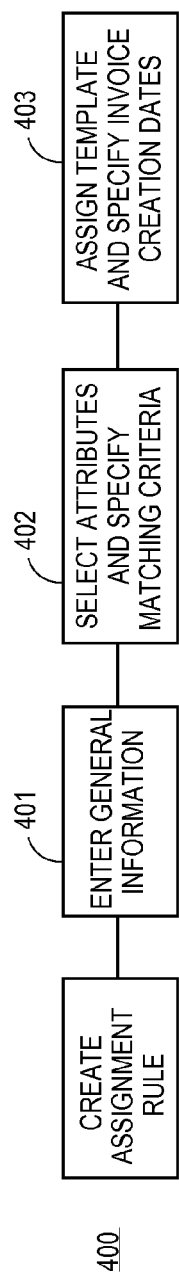
FIG. 4A is a flowchart of a process for creating an assignment rule, according to one embodiment of the present invention.

FIG. 4A is a flowchart describing a computer implemented process 400 for creating an assignment rule. Process 400 begins with step 401, wherein general information is entered. In step 402, attributes are selected and matching criteria are specified. In step 403, a template is assigned and invoice creation dates are specified, completing process 400.

In one embodiment, template assignment, like another aspect of the BPA 100, provides information to a user in the form of web content that allows a user to interact with a computer system for the generation, use, and modification of templates and other aspects. Upon providing this information to a user, a computer-controlled programming tool in one embodiment allows the user to take corresponding action and/or input further information using a corresponding interface, which can be a GUI, to generate, modify, or use templates.

With information provided to a user via a series of interactive windows and/or webpages, etc. on a monitor, the GUI allows the user to input information to the system using, for example, a keyboard, another alphanumeric input device, and/or a mouse or similar device. Upon receiving such inputs, a code generator generates corresponding program code for programming a programmable communication plan generation tool. In one embodiment, a template is generated by the tool, which a user can apply to create and store the template in an electronic format. In one embodiment, these steps and/or other consideration and tasks can be represented by steps and processes described above.

FIG. 4E depicts an exemplary page 435 for creating a rule (e.g., process 400; FIG. 4A), according to one embodiment of the present invention. Page 435 allows the user to create an assignment rule, selecting the pre-defined attributes and specifying their matching criteria. The rule is named in field 435N and described in field 435D. A supplemental data source is specified in field 435S, such as by choosing from selections listed in a pop up or drop down or associated fixed menu.

Attribute matching criteria are chosen by selecting from either "all" or "any" attributes using match buttons 435B. An attribute is selected from a list 435L, which can be a pop up, drop down, or fixed menu associated with attribute field 435A. A condition, such as "equals", is specified in field 435C that compares the selected attribute to a value specified in field 435V.

The chosen attribute will determine the acceptable values for matching. For instance, if "Profile Class" is chosen from list 435L, the list of available values will contain only the classes from a receivables profile. Similarly, if "Billing Date" is chosen from list 435L, the only acceptable values will be dates. The user then assigns completed templates to the rule, indicating invoice creation dates. Available templates for assignment are filtered based on the supplementary source application of the rule, selected in field 435S, as well as the tax printing option attribute specified by the receivables application. Rules with this assignment attribute can only be assigned templates with a tax format of "Custom".

A unique rule name should be entered in one embodiment. If the name of a rule that already exists in the system is entered into field 435N (or if the field is left blank), an error message will appear when the user tries to exit the page. Values must be entered for "Attribute Name" in field 435A, "Supplementary Data Source" in field 435S, "Condition" in field 435C, and value in field 435V. If these values are not entered, an error message will appear when the user tries to exit the page.

FIG. 4F depicts a page 436 for assigning the template based on the created rule. The assigned template is listed in field 436A, and is made effective inclusively between the date listed in field 436F and the date listed in field 436T. Rules available for reordering are listed in list 438, as specified by supplemental data source, which is selected from field 439. The Invoice Creation From Date in field 436F must be earlier than or equal to the Invoice Creation To Date in field 436T. In one embodiment, Invoice Creation dates should not overlap in one embodiment. When a rule is created, a confirmation message appears.

Figure 4B:
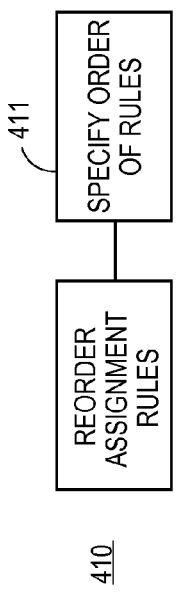
FIG. 4B is a flowchart of a process for reordering an assignment rule, according to one embodiment of the present invention.

FIG. 4B is a flowchart describing a process 410 for reordering template assignment rules, according to one embodiment of the present invention. Process 410 comprises step 411, wherein the order corresponding to the rules is specified.

Figure 4G:
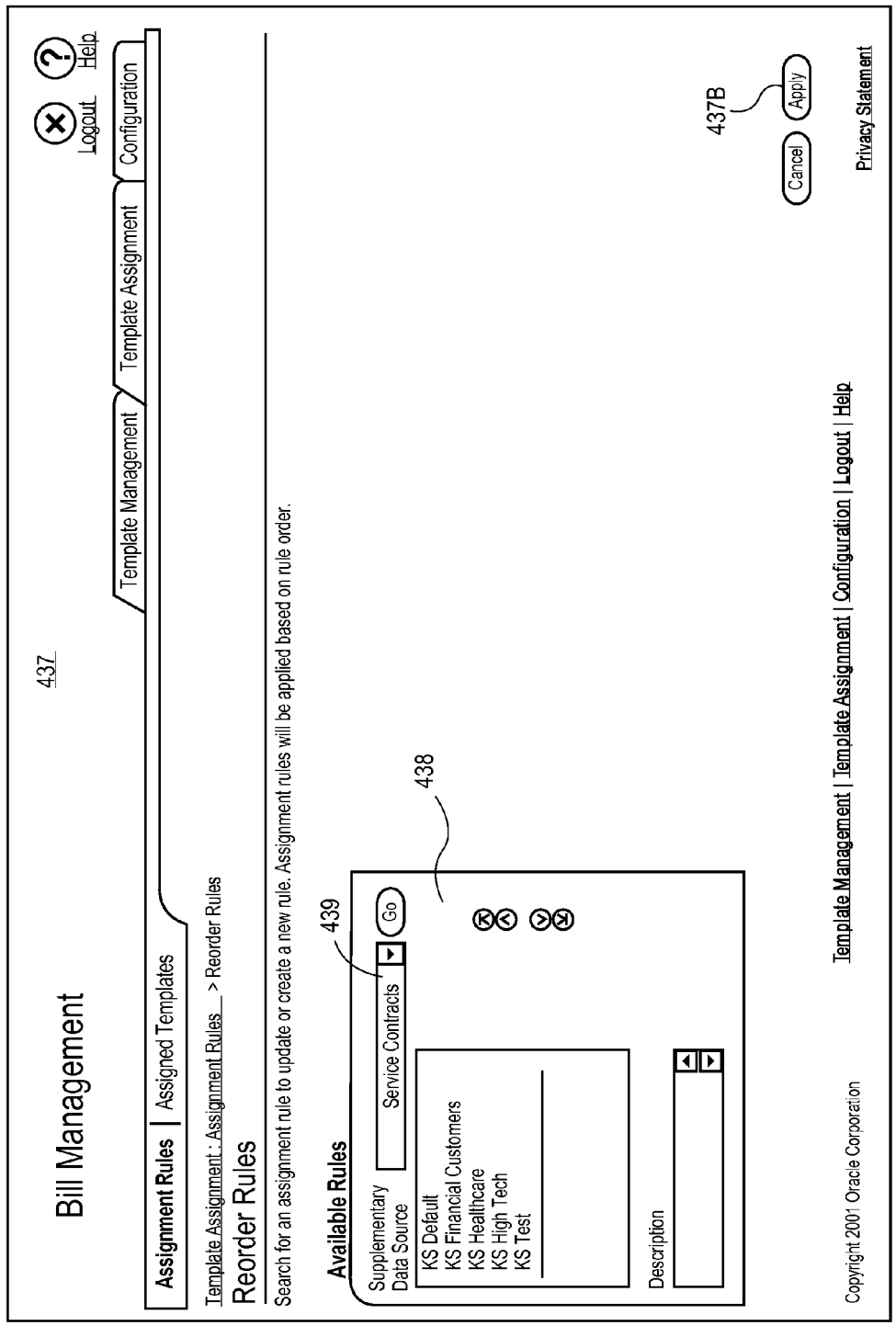
FIG. 4G depicts an on-screen display window for changing an order for applying a rule to a supplementary data source, according to one embodiment of the present invention.

FIG. 4G depicts a page 437 for reordering rules (e.g., process 410; FIG. 4B), according to one embodiment of the present invention. Page 436 allows the user to order the existing pre-defined and user-defined assignment rules to indicate the sequence in which the rules are applied during template assignment. Available rules are listed in list 438. These are the rules available for the supplemental data source specified in field 439. Rule order can be saved for the source application (e.g., supplementary data source); when the user reorders rules and presses the Apply button 437B, a confirmation message appears.

FIG. 4C is a flowchart describing a computer implemented process 420 for searching an assignment rule, according to one embodiment of the present invention. Process 420 begins with step 421, wherein viewing a rule is specified. This allows the user to view the general information and attribute matching criteria and corresponding values of an assignment rule, as well as the template assignments. In step 422, attribute matching criteria corresponding to the rule are viewed.

In step 423, updating the rule is specified. This allows the user to add template assignments and update existing assignments of a user-defined rule. The user can also update the properties of a user-defined assignment rule, such as the general information and assignment attributes.

In step 424, general information is updated. In step 425, a list of attributes and matching criteria is updated. In step 426, template assignments and invoice creation dates are updated. In step 427, a rule is deleted. This allows the user to delete user-defined assignment rules. Process 420 can be complete upon completion of step 422, 426, or 427.

FIG. 4C is a flowchart describing a process 430 for searching an assigned template, according to one embodiment of the present invention. Process 430 begins with step 431, wherein viewing a template is specified. In step 432, viewing a corresponding rule is specified.

FIG. 4H depicts an exemplary page 440 for facilitating a user's search for an assignment rule to update or create a new rule. Assignment rules, in the present embodiment, are applied based on rule order. A rule name is specified in field 440N. The rule is described in field 440D. A supplemental data source is specified in block 440S. Search results are listed in table 440R. Page 440 allows the user to search for an existing assignment rule based on name, description, or source. Once results are displayed in list 440R, the user can choose to view, update, or delete the user-defined rule using the appropriate corresponding button 440B, or view the pre-defined rule by clicking on the hyperlinked rule name in column 440H.

The user is prompted by a message such as "Are you sure you want to delete rule &RULE_NAME? Yes or No" upon selecting to delete a rule (e.g., step 427 of process 420; FIG. 4C). When the user chooses to delete an assignment rule, a message appears to verify the action, such as "Rule &RULE_NAME has been deleted." A confirmation message appears after rule has been deleted.

Exemplary Configuration

Some configuration can be helpful before and/or during template management. This includes registering source applications and defining drilldown URLs that are to be incorporated in the templates. A source application can be created. The source application can have multiple corresponding data sources, each containing content items. Links to the content items and data sources provide drilldown capability in one embodiment.

Figure 5C:
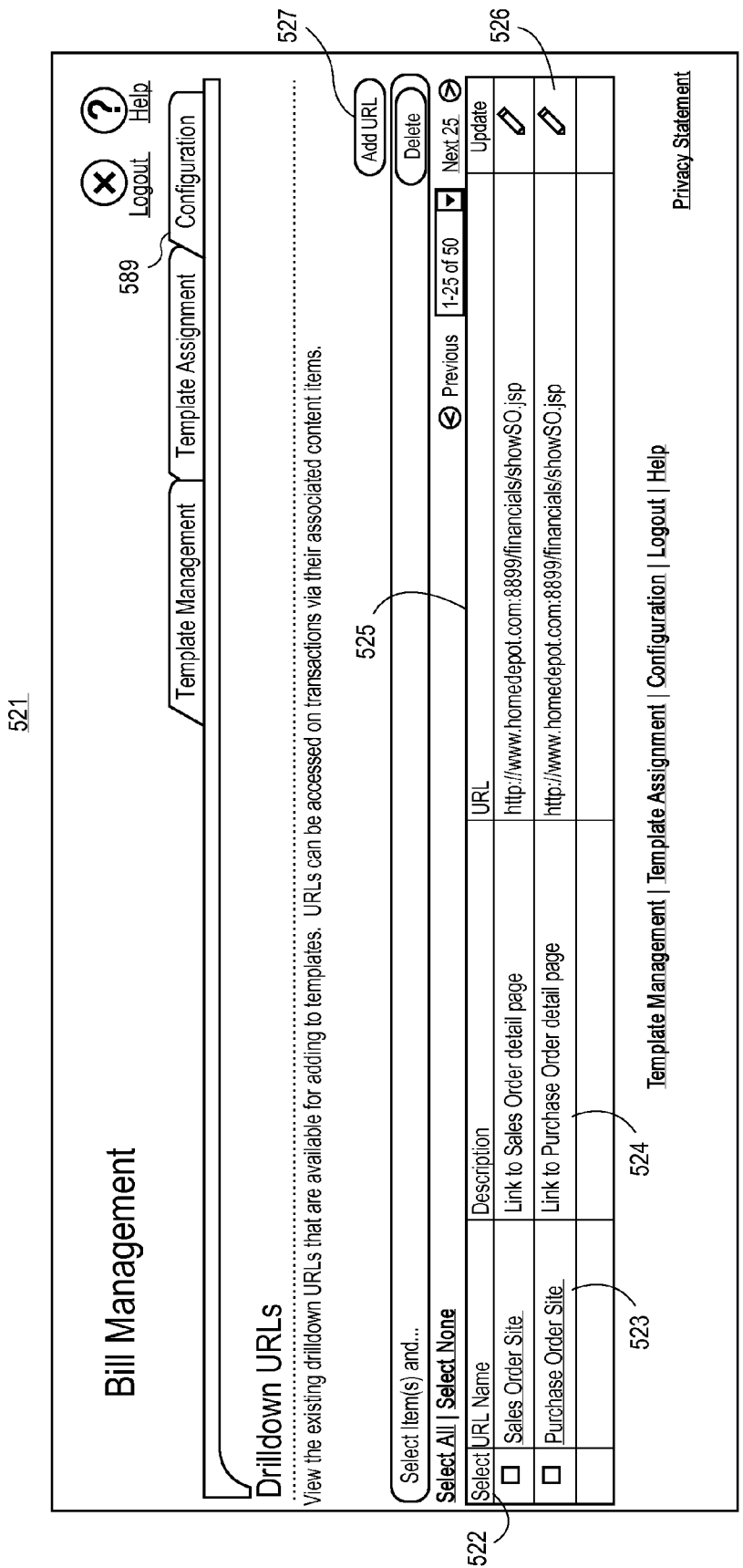
FIG. 5C depicts an on-screen display window for searching a URL, according to one embodiment of the present invention.

FIG. 5A1 is a flowchart depicting a process 500 for registering and searching a source application, according to one embodiment of the present invention. Process 500 begins with step 501, wherein a source application is registered. In step 502, the source application is searched. In step 503, details of the source application are viewed. In optional step 504, the source application is updated. In optional step 505, a source application is deleted.

The links are accessible via the content item to which it is associated, such as by clicking a hyperlink embedded thereon, which points to and links to a specified URL. In order for a user such as a designer of the template to associate a URL, a user such as a system administrator configures the name associated corresponding to the URL. A link (e.g., a hyperlink) can be included on a template. A user such as a system administrator can include such a link on a template to create a drilldown URL that can be incorporated into a template via association to a content item. The drilldown URL can comprise the link.

Including the link on the template can be performed by interacting with a computer system deploying BPA 100 using a computer-controlled programming tool, in one embodiment, which can be a GUI. The GUI allows the user to input information to the system using, for example, a keyboard, another alphanumeric input device, and/or a mouse or similar device. Upon receiving such inputs, a code generator generates corresponding program code for including a link to a drilldown URL. In one embodiment, a link to a drilldown is generated by the tool, which a user can apply to include on a template in an electronic format such as a hyperlink.

FIG. 5A2 is a flowchart depicting a process 510 for creating and searching a drilldown URL, according to one embodiment of the present invention. Process 510 begins with step 511, wherein a drilldown URL is created. In step 512, the drilldown URL is searched. In step 513, details of the drilldown URL are viewed. In optional step 514, the URL is updated. In optional step 515, a URL is deleted.

In one embodiment, a page 516 effectuates part of process 510. Page 516 allows a URL to be added by naming the URL in field 516N, describing it in field 516D, and entering the URL (e.g., domain name or DNS code) corresponding to the named URL. Parameters corresponding to the URL and their values are entered in the fields within URL parameters display 516M. The parameter values must either be fixed, or mapped to a transaction attribute. The parameter type is entered in the fields corresponding to column 516T. The parameter name is entered in the fields corresponding to column 516P. The parameter value is entered in the fields corresponding to column 516V. Encryption can be added to a particular row within display 516M by clicking a corresponding check box 516E. A URL parameter can be removed by clicking a corresponding button 516R.

FIG. 5D is a flowchart depicting a process 517 for searching a list of current drilldown URLs that are available for inclusion on templates. Process 517 begins with step 518, wherein a user such as a system administrator views the source application details, including its data sources, parameters and content items. In step 518, the system administrator updates the source application details, such as the description, data sources, parameters, and content items. In optional step 519, the system administrator deletes the source application.

Existing drilldown URLs can be searched (e.g., process 517; FIG. 5D) using a page 521, depicted in FIG. 5E. Select button 522 allows the user to select a particular row, identified for example by the URL name of column 523. The URL is described in column 524. The actual URL is displayed in column 525. Updating can be specified by buttons 526, and a URL can be added upon clicking button 527.

Exemplary Bill Presentment

Referring again to FIG. 1, bill presentment module 105 of BPA 100 allows a user to construct a bill for presentment. When users construct a bill for presentment, they can place data anywhere on the bill. Specific billing items and associated information such as amount, quantity, pricing, tax, and any other supporting information can be placed in the "Lines and Tax" region. Any additional information, or detailed "children" lines of these billing lines, can be placed in the "Details" region. Outside the "Lines and Tax" and "Details" regions, a user can place all non-billing specific items, such as addresses, reference information, payment terms, dates, contact information, balances, messages, etc.

In the template management module 103, the "Lines and Tax" region (e.g., lines and tax region 342 of page 340; FIG. 3E) of the "Primary Page Design" step (e.g., step 302 of process 300; FIG. 3A) contains transaction line information that the supplementary data source can potentially send to the accounts receivable (AR) application for invoicing. Where AR invoice lines can be rolled up to a higher level, the group information will be available for bill presentment selection as well. Where there is group information for the AR invoice lines and the checkbox "Display Grouped Receivables Transaction Lines if available" (e.g., from tax formatting option field 336 of page 331; FIG. 3D) is checked, the top billing line presented on the main page of the bill will be the group level information. Users can drill down from top level billing lines to view the second level billing lines. If there is no group information for the AR invoice lines, or there is group information but the checkbox "Display Grouped Receivables Transaction Lines if available" is unchecked, the top billing lines will actually be the AR invoice lines. Different levels of billing lines will share the same formats and columns.

If the user chooses to display itemized tax information on the bill, the checkbox "Display Itemized Tax by Line" (e.g., checkbox 369P of page 369; FIG. 3I) located in the "Billing Lines" section (e.g., billing lines section 369L of page 369; FIG. 3I) should be checked. The itemized tax will appear along with the billing lines corresponding to the AR invoice lines which may or may not be the top level billing lines. Thus, the itemized tax lines may or may not be viewable on the main page of the bill. Grouped AR lines will also have associated grouped itemized tax lines presented below them. Where the user chooses to display summarized tax information on the bill, the data to be presented can be chosen in the "Summarized Tax" section (e.g., section 369T of page 369; FIG. 3I) and will appear in a tabular format below the billing lines table on the primary page.

The "Details Design Page" step (e.g., step 303 of process 300; FIG. 3A) is used to select any data directly associated with the billing lines, but not sent by the supplementary data source to the receivables application for accounting related processing. This data can be accessed via links (e.g., hyperlinks) from the billing lines and will be displayed in a tabular format on a secondary page in the same window as the primary page.

Users can use template management module 103 to construct the "Lines and Tax" and "Details" tables. Any further levels of drilldown display are handled natively by a UI associated with each source application. Such further levels of drilldown can be displayed on pages such as the HTML pages of the source application or a physical document, and can be accessible via any content item on the bill. Source applications can provide the destination of the pages or document via the Drilldown URLs page (e.g., drilldown URLs page 521; FIG. 5E) under a Configuration tab therein (e.g., configuration tab 589 of page 521; FIG. 5E). Once the URL is configured in BPA 100, the template designer can associate the URL to any content item.

The way a bill is presented is described with reference to scenarios 3 and 4, below. Scenario 3 applies to source applications that can switch the level of information interfaced to AR for invoicing. For example, a contracts services application such as OKS™ (commercially available by Oracle, Inc.) can send either summary or detail transaction lines to the AR application, which can be Oracle Receivables™ (also commercially available by Oracle, Inc.). In this case, views containing the summary (service level) and detail (product level) information are registered and associated with the Billing Lines section. Regardless of whether summary or detail transaction lines are sent to AR, the "Billing Lines" section of the "Primary Page Design" step will be used to select billing line columns for both service and product level information. The "Details Page Design" step will be used to select additional information pertaining to the product-level billing lines if there is any. The information defined in the Details page will always appear in table layout on a separate page within the same window.

In Case I above, wherein the contracts services application (e.g., OKS™) interfaces summary information (service level) to the receivables application (AR; e.g., Oracle Receivables™), the AR invoice lines become the top level billing lines. The product level information will be generated by BPA 100 at run time and be displayed as the second level billing lines. The second level billing lines will appear on a separate page and share the columns selected in the "Billing Lines Section". In this case, there is no rollup of AR invoice lines because, e.g., there is no higher level grouping information for service lines, regardless of whether the checkbox "Display Grouped Oracle Receivables Transaction Lines if available" is checked or not.

In Case II above, wherein the contracts services application (e.g., OKS™) interfaces detail information (product level) to AR (e.g., Oracle Receivables™), the AR invoice lines may or may not be the top level billing lines. If the checkbox "Display Grouped Receivables Transaction Lines if available" is checked, BPA 100 groups the AR invoice lines to the service level lines and display as the top billing lines on the bill. The AR invoice lines (e.g., product level information) become the second level billing lines. If the checkbox "Display Grouped Receivables Transaction Lines if available" is unchecked, the AR invoice lines become the top level billing lines, and the service level information is not displayed.

By default, the checkbox "Display Grouped Receivables Transaction Lines if available" is always checked, in one embodiment. It is appreciated that Oracle OKS™ also sends contract lines for usage and subscriptions to Oracle Receivables™. Detail level information can be sent for these line types; in such a case, there is no grouping information provided. Thus, the behavior matches the examples described in Scenario 4, below.

Scenario 4 applies to source products that cannot switch the level of information interfaced to AR for invoicing. For example, projects applications and exchange applications such as Oracle Projects™ and Oracle Exchange™ may always sum up the detailed billing lines to interface to AR, and detailed lines remain in the source application. In this case, the "Billing Lines" section of the "Primary Page Design" step will be used to select columns for the AR invoice line level information or the level above it. The AR invoice lines may or may not be the top level billing lines depending on if there is grouping information above, which gets sent to AR in the source application. The "Details Page Design" step will be used to select any drilldown details pertaining to the billing lines sent to the AR application.

Figure 6A:
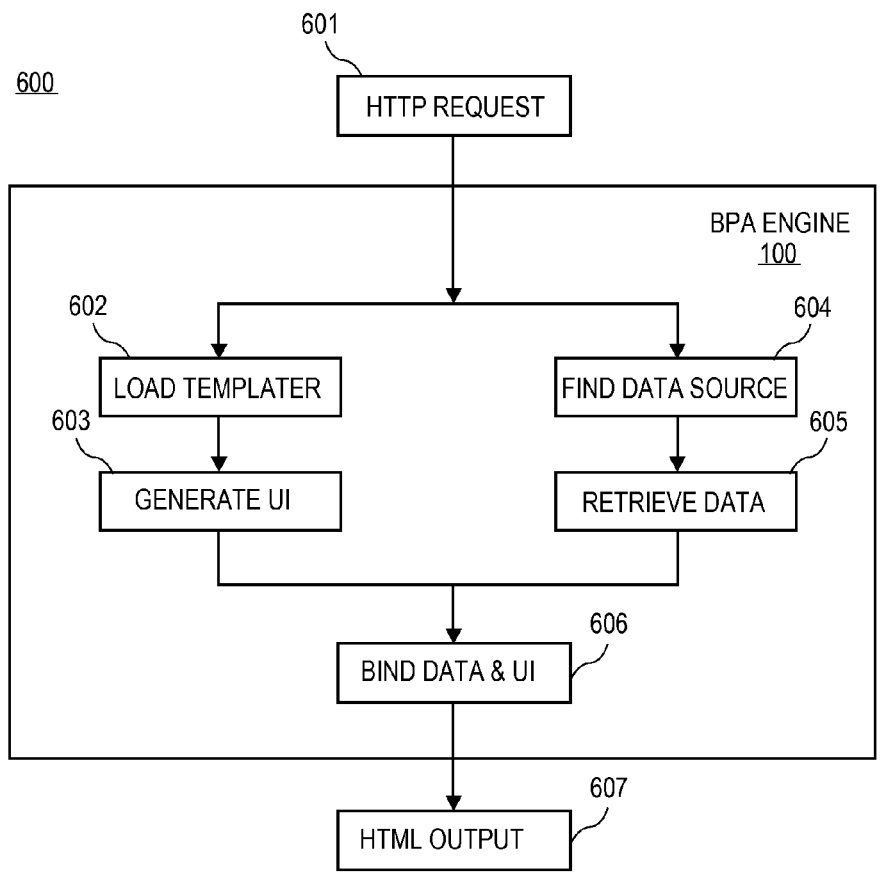
FIG. 6A is a flowchart of a process for generating a bill, according to one embodiment of the present invention.

FIG. 6A depicts a bill presentment engine (BPE) 600 associated with BPA 100, according to one embodiment of the present invention. Using BPE 600, when a user clicks on a transaction number online via a receivables application or any other calling application, a bill is generated at run time.

Clicking on the transaction number activates a corresponding hyperlink which presents BPE 600 with a hypertext transfer page (HTTP) request 601. In response to HTTP request 601, BPE 600 loads 602 an appropriate template and finds 603 an appropriate data source.

In response to loading 602 the template, BPE 600 generates 603 an appropriate UI, which can comprise the pages described above (e.g., page 331; FIG. 3D). In response to finding 604 the data source, BPE 600 retrieves 605 data.

In response to generating 603 the UI and retrieving 605 the data, BPE 600 binds 606 the data and the UI. In response to binding 606 the data and the UI, BPE 600 outputs 607 a bill at runtime, for instance, as a Hypertext Markup Language (HTML) output.

Such a bill can comprise a format as exemplified in FIG. 6B as a bill 608. Bill 608 (e.g., a primary bill page) is initially presented with the top level billing lines in the "Lines and Tax" region. These billing lines are hyperlink enabled via the "Description" column 610 for viewing of the lower level billing lines, or the details for these billing lines. Data anywhere outside of the "Lines and Tax" region can also be hyperlink enabled, where they can be linked to any other related documents or HTML pages.

Each level of billing data will be displayed separately in its own page. The top-level billing lines appear on the primary page 608 of the bill. If there are lower levels of billing information, a user can progressively drill down via the link on the "Description" column 610 to a separate page in the same window. Breadcrumb links on the drilled-down pages will allow the user to return to the original page.

In one embodiment, billing line and details tables are displayed one by one. For instance, with reference to FIG. 6C, second level billing lines are depicted on second level bill 611, wherein top level billing line A is drilled to its table A of second level lines, table B of second level lines for top level billing line B cannot be viewed simultaneously on the same page 611. Instead, table B of second level lines will replace table A of second level lines 611 once link B is clicked.

Similar behavior is followed for details tables 615 as well, depicted in FIG. 6C. Referring to FIG. 6B, in one embodiment, where table of lines exceed 25 rows, the table are truncated at the 25th row. The remaining rows can be viewed by clicking the "Next" link 612 at the top right corner of the table 611. The "Previous" link 613 takes the user back to the previous 25 rows.

Where the online-presented bill 608 is embedded in the receivables application, a "Printable Page" functionality available on the UI associated with the receivables application (e.g., iReceivables™, commercially available by Oracle, Inc.) can be used to print the bill from the browser. The printable page will retain the "look and feel" of the displayed page. Underlines (e.g., signifying hyperlinks in the displayed bill on line) will be retained on the printed bill. General browser printing functionality will also be available, and can also be used to print the bill.

When a bill is presented through a receivables application such as iReceivables™ or other self-service calling applications, two separate responsibilities are defined for external users and internal users. Where the deploying entity (e.g., a company) wants to restrict external customers or internal users from accessing the billing detailed information defined in the Details page section of provided by template management module 103 (FIG. 1), an official such as a system administrator can define function security at both the responsibility and user level.

Figure 6E:
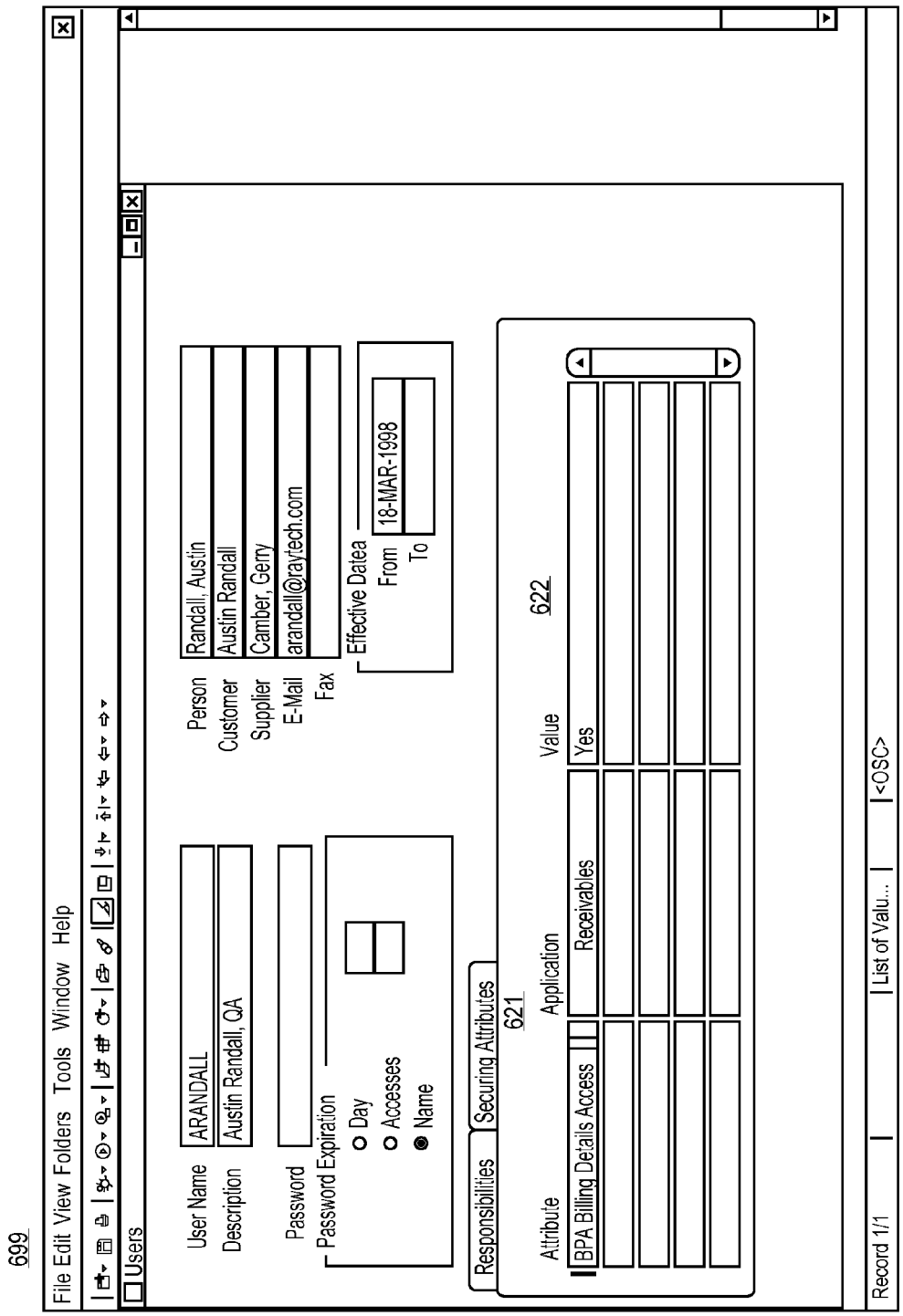
FIG. 6E depicts an on-screen display window for displaying and selecting securing attributes corresponding to a template and a bill, according to one embodiment of the present invention.

For example, referring to FIG. 6E, in a "Define Users" window 699 in an application such as Oracle Applications™ (commercially available by Oracle, Inc.), the user account can be queried. In the Securing Attributes tab 621, an attribute "BPA Billing Details Access" can be selected. In the values column 622, entering a value of "Yes" allows viewing; entering a value of "No" disallows viewing. Users lacking access will not have links on their bill from the lowest level billing lines to the details information.

Exemplary Data Model

Figure 7:
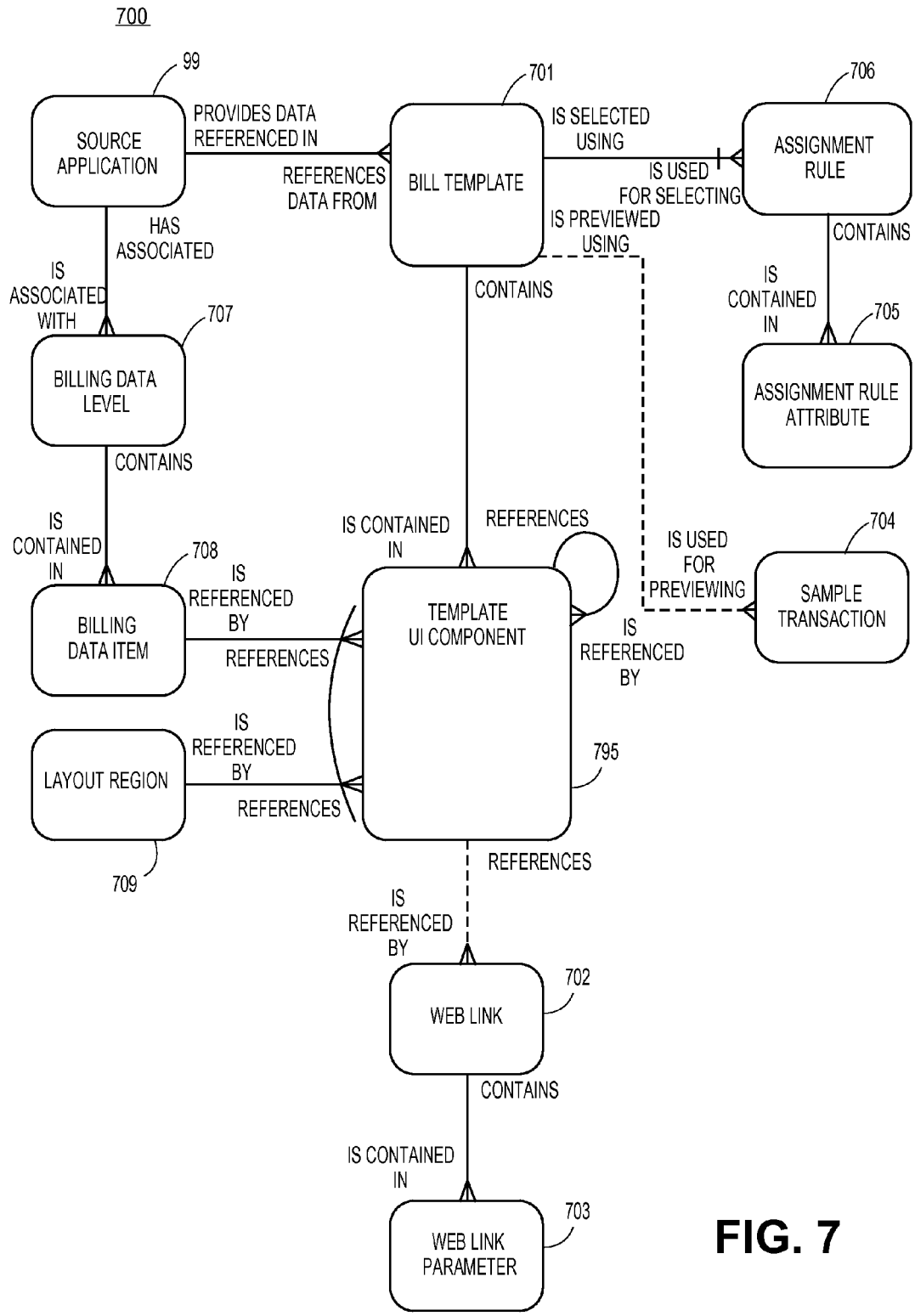
FIG. 7 depicts a logical data model for a bill presentment architecture, according to one embodiment of the present invention.

FIG. 7 depicts a logical data model 700 for BPA 100 according to one embodiment of the present invention. Bill template 701 references data from source application 99. Bill template 701 contains a template UI component 795. Bill template 701 is selected using assignment rule 706, which contains an assignment rule attribute 705. Further, bill template 701 is previewed using sample transaction 704. Source application 99 is associated with billing level data 707, and provides data referenced in bill template 701. Template UI component 795 references web link 702, which contains a parameter 703. Template UI component 95 also references layout region 709 and billing data item 708. Further, template UI component 795 references (and is referenced by) other template UI components 795. Elements 99, 701-709 and 795 can correlate to pages, applications, interfaces, and components discussed above.

In one embodiment, a computer readable medium having a computer readable code program code embodied therein programs a computer system to perform processes by which BPA 100 operates and can be used, such as are described in the flowcharts above. In one embodiment, information is provided to the user from the system and information can be entered interactively via an interface such as a GUI, the operation of which is also effectuated by programming code embodied in such a medium.

In summary, embodiments of the present invention provide an architecture and method for bill presentment using a web-based tool. One embodiment of the present invention provides a bill presentment architecture (BPA). In one embodiment, the BPA allows bills to be generated according to a template, with drilldown capability to allow a user to access billing details. In one embodiment, a GUI enables a user to interact with a computer system to generate and use the templates through means of a series of interactive HTML pages, associated with a computer-based code generator. Thus, in one embodiment, the BPA functions on a computer based system that is under the control of a computer readable medium having therein a code. One embodiment of the present invention serializes the BPA functions by several processes comprising steps with logic built in to help guide a user and provide the user with guidelines and criteria for generating bills that can be readily understood by the billee, such that the billee is more likely to timely pay the bill with a reduced need for explanation, thus promoting commercial efficiency. The present embodiment provides a novel process and combination of tools which promote an approach to the presentment of bills in a useful, simple way.

An embodiment of the present invention, an architecture and method for bill presentment using a web-based tool, is thus described. While the present invention has been described in particular embodiments, the present invention should not be construed as limited by such embodiments, but rather construed according to the following claims and their equivalents.

What is claimed is:

1. A computer based bill presentment system for presenting a bill, wherein the bill is rendered in HyperText Markup Language (HTML), the system comprising:
   a processor; and
   a memory coupled with and readable by the processor and having stored therein a sequence of instructions which, when executed by the processor, causes the processor to provide:
   an integration layer of the bill presentment system, integrating a plurality of data sources with the system wherein the integration layer comprises a source registration module registering the plurality of data sources and an application integration module receiving data from the source registration module and integrating the functionality of the plurality of data sources with the bill presentment system,
   wherein the plurality of data sources comprises at least one component of a primary source application, the primary source application comprising a receivables application, and at least one component of one or more supplementary source applications,
   wherein each supplementary source application comprises an application that can integrate with the primary application, wherein the at least one component of the primary source application comprises a table of the receivables application containing data to be populated in the bill, wherein the at least one component of one or more supplementary source applications comprises one or more tables of the one or more supplementary source applications containing date to be populated in the bill and wherein the one or more supplementary source applications are selected from a group consisting of a contract services application, an order management application, a projects application, and a property management application,
   wherein registering comprises receiving and recording in a table application specific views of the plurality of data sources, and wherein integrating comprises assimilating data from the registered plurality of data sources,
   a template layer of the bill presentment system receiving data from the integration layer and generating a template for the bill, wherein the template assigned to a customer and defines a layout and a content of the bill for the customer, and
   a presentation layer of the bill presentment system receiving data from the integration layer and the template layer, receiving a request to generate a bill, loading the template, generating a user interface in response to the template, retrieving the assimilated data from the registered plurality of data sources and corresponding to information to be presented in the bill, grouping data of the table of the receivables application and the one or more tables of the one or more supplementary source applications into one or more categories based on key values for the data from each data source, each category representing a line of the invoice, binding the retrieved data and the user interface, and outputting the bill to the customer.

2. The system as recited in claim 1
wherein the template layer comprises:
   a template management module, for receiving a selection of at least one data element for the template and for creating and updating the template for the bill; and
   a template assignment module receiving data from the template management module, for assigning the template to the customer, wherein the template is assigned to the customer based on the selection of the at least one data element.

3. The system as recited in claim 1
wherein the presentation layer comprises a presentation module for communicating request to generate the bill to the template layer, to receive data from the integration layer and the template layer, and in response to the receiving, to prepare and display the bill.

4. The system as recited in claim 3
wherein the data comprises meta-data and billing data, wherein the meta-data comprises information for laying out a content area of the bill and information about an item included on the bill, wherein the billing data comprises information requested by the user for the assimilated data.

5. The system as recited in claim 1
wherein the bill presents the information as summary information.

6. The system as recited in claim 5
wherein the bill comprises a hyperlink and wherein the hyperlink allows the customer to drilldown from the summary information to corresponding more detailed information.

7. The system of claim 1,
wherein the key values for the data from each data source further comprise a reference to the data source and wherein the presentation layer further provides a drill down view to the grouped data through the user interface based on the key values.

8. The system of claim 7,
wherein the drill down view to the grouped data comprises detail of the table of the receivable application.

9. The system of claim 7,
wherein the grouped data includes the at least one component of one or more supplementary source applications and wherein the drill down view to the grouped data comprises detail of the one or more tables of the one or more supplementary source applications.

10. A machine-readable memory having stored thereon a sequence of instructions which, when executed by a processor, cause the processor to execute a bill presentment system comprising:
   an integration layer of the bill presentment system, integrating a plurality of data sources with the system wherein the integration layer comprises a source registration module registering the plurality of data sources and an application integration module receiving data from the source registration module and integrating the functionality of the plurality of data sources with the bill presentment system,
   wherein the plurality of data sources comprises at least one component of a primary source application, the primary source application comprising a receivables application, and at least one component of one or more supplementary source applications,
   wherein each supplementary source application comprises an application that can integrate with the primary application, wherein the at least one component of the primary source application comprises a table of the receivables application containing data to be populated in the bill, wherein the at least one component of one or more supplementary source applications comprises one or more tables of the one or more supplementary source applications containing date to be populated in the bill and wherein the one or more supplementary source applications are selected from a group consisting of a contract services application, an order management application, a projects application, and a property management application, wherein registering comprises receiving and recording in a table application specific views of the plurality of data sources, and wherein integrating comprises assimilating data from the registered plurality of data sources, a template layer of the bill presentment system receiving data from the integration layer and generating a template for the bill, wherein the template is and defines a layout and a content of the bill for the customer, and a presentation layer of the bill presentment system receiving data from the integration layer and the template layer, receiving a request to generate a bill, loading the template, generating a user interface in response to the template, retrieving the assimilated data from the registered plurality of data sources and corresponding to information to be presented in the bill, grouping data of the table of the receivables application and the one or more tables of the one or more supplementary source applications into one or more categories based on key values for the data from each data source, each category representing a line of the invoice, binding the retrieved data and the user interface, and outputting the bill to the customer.

11. The machine-readable memory as recited in claim 10 wherein the template layer comprises:
a template management module, for receiving a selection of at least one data element for the template and for creating and updating the template for the bill; and
a template assignment module receiving data from the template management module, for assigning the template to the customer, wherein the template is assigned to the customer based on the selection of the at least one data element.

12. The machine-readable memory as recited in claim 10 wherein the presentation layer comprises a presentation module for communicating request to generate the bill to the template layer, to receive data from the integration layer and the template layer, and in response to the receiving, to prepare and display the bill.

13. The machine-readable memory as recited in claim 12 wherein the data comprises meta-data and billing data, wherein the meta-data comprises information for laying out a content area of the bill and information about an item included on the bill, wherein the billing data comprises information requested by the user for the assimilated data.

14. The machine-readable memory of claim 10, wherein the key values for the data from each data source further comprise a reference to the data source and wherein the presentation layer further provides a drill down view to the grouped data through the user interface based on the key values.

15. The machine-readable memory of claim 14, wherein the drill down view to the grouped data comprises detail of the table of the receivable application.

16. The machine-readable memory of claim 14, wherein the grouped data includes the at least one component of one or more supplementary source applications and wherein the drill down view to the grouped data comprises detail of the one or more tables of the one or more supplementary source applications.

17. A method for generating a bill comprising:
registering a plurality of data sources with a bill presentment computer system, wherein the plurality of data sources comprises at least one component of a primary source application, the primary source application comprising a receivables application, and at least one component of one or more supplementary source applications, wherein each supplementary source application comprises an application that can integrate with the primary application, wherein the at least one component of the primary source application comprises a table of the receivables application containing data to be populated in the bill, wherein the at least one component of one or more supplementary source applications comprises one or more tables of the one or more supplementary source applications containing date to be populated in the bill and wherein the one or more supplementary source applications are selected from a group consisting of a contract services application, an order management application, a projects application, and a property management application, and wherein registering comprises receiving and recording in a table application specific views of the plurality of data sources;

integrating the functionality of the plurality of data sources with the bill presentment computer system, wherein integrating comprises assimilating data from the registered plurality of data sources;

generating a template for the bill with the bill presentment computer system, wherein the template defines a layout and a content of the bill for the customer, receiving at the bill presentment computer system a request to generate the bill;

loading the template with the bill presentment computer system;

generating a user interface with the bill presentment computer system based on the template;

retrieving with the bill presentment computer system the assimilated data from the registered plurality of data sources and corresponding to information to be presented in the bill;

grouping with the bill presentment computer system data of the table of the receivables application and the one or more tables of the one or more supplementary source applications into one or more categories based on key values for the data from each data source, each category representing a line of the invoice;

binding with the bill presentment computer system the retrieved data and the user interface; and outputting the bill to the customer with the bill presentment computer system.

18. The method as recited in claim 17 wherein generating the template comprises: receiving a selection of at least one data element for the template; and
assigning the template to the customer based on the selection of the at least one data element.

19. The method of claim 17, further comprising
providing a drill down view to the grouped data through the user interface, wherein the key values for the data from each data source further comprise a reference to the data source and wherein providing the drill down view to the grouped data through the user interface is based on the key values.

20. The method of claim 19, wherein the drill down view to the grouped data comprises detail of the table of the receivable application.

21. The method of claim 19, wherein the grouped data includes the at least one component of one or more supplementary source applications and wherein the drill down view to the grouped data comprises detail of the one or more tables of the one or more supplementary source applications.

* * * * *

UNITED STATES PATENT AND TRADEMARK OFFICE
CERTIFICATE OF CORRECTION

| | | |
|---|---|---|
| PATENT NO. | : 8,175,969 B2 | Page 1 of 1 |
| APPLICATION NO. | : 10/453222 | |
| DATED | : May 8, 2012 | |
| INVENTOR(S) | : Yang et al. | |

It is certified that error appears in the above-identified patent and that said Letters Patent is hereby corrected as shown below:

In the drawings: On sheet 33 of 34, in figure 6E, line 10, delete "Datea" and insert -- Date --, therefor.

In column 2, line 15, delete "it" and insert -- its --, therefor.

In column 3, line 47, delete "The, in" and insert -- In --, therefor.

In column 7, line 57, after "an" delete "for".

In column 14, line 44, delete "Autoinvoice" and insert -- AutoInvoice --, therefor.

In column 30, line 7, delete "Applications™" and insert -- Application™ --, therefor.

Signed and Sealed this
Thirty-first Day of July, 2012

David J. Kappos
*Director of the United States Patent and Trademark Office*